United States Patent
Kitahara et al.

(10) Patent No.: US 7,298,687 B2
(45) Date of Patent: Nov. 20, 2007

(54) OPTICAL RECORDING MEDIA OBJECTIVE LENS AND OPTICAL PICKUP DEVICE USING IT

(75) Inventors: Yu Kitahara, Saitama (JP); Toshiaki Katsuma, Tokyo (JP); Tetsuya Ori, Koshigaya (JP)

(73) Assignee: Fujinon Corporation, Saitama (JP)

( * ) Notice: Subject to any disclaimer, the term of this patent is extended or adjusted under 35 U.S.C. 154(b) by 459 days.

(21) Appl. No.: 10/874,388

(22) Filed: Jun. 24, 2004

(65) Prior Publication Data

US 2004/0264353 A1    Dec. 30, 2004

(30) Foreign Application Priority Data

Jun. 30, 2003    (JP)    ............... 2003-188832

(51) Int. Cl.
*G11B 11/00*    (2006.01)
(52) U.S. Cl. .................. 369/112.23; 369/112.01; 369/112.05; 369/112.03
(58) Field of Classification Search ............ None
See application file for complete search history.

(56) References Cited

U.S. PATENT DOCUMENTS

2002/0089764 A1*    7/2002    Ikenaka et al. ............ 359/719

2003/0151996 A1*    8/2003    Hendriks et al. .......... 369/53.2
2003/0223124 A1    12/2003    Kitahara et al.

FOREIGN PATENT DOCUMENTS

| JP | H09-145994 | 6/1997 |
| JP | H09-145995 | 6/1997 |
| JP | H09-197108 | 7/1997 |

* cited by examiner

*Primary Examiner*—William R. Korzuch
*Assistant Examiner*—Joseph R. Haley
(74) *Attorney, Agent, or Firm*—Arnold International; Bruce Y. Arnold

(57) ABSTRACT

An optical recording media objective lens is disclosed for converging either of two working lights of a first wavelength or a second wavelength. The working light of the first wavelength is converged at a first numerical aperture onto the first optical recording medium and the working light of the second wavelength is converged at a second numerical aperture onto the second optical recording medium. An aperture adjusting zonal part is included on at least one of the objective lens surfaces for apparently eliminating light at the periphery of a light flux having a wavelength $\lambda_1$ while maintaining light at the periphery of a light flux having a wavelength $\lambda_2$, where $\lambda_1$ is one of the first and second wavelengths and $\lambda_2$ is the other wavelength. The aperture adjusting zonal part is formed so as to satisfy two conditions.

16 Claims, 16 Drawing Sheets

$\lambda = 790nm$

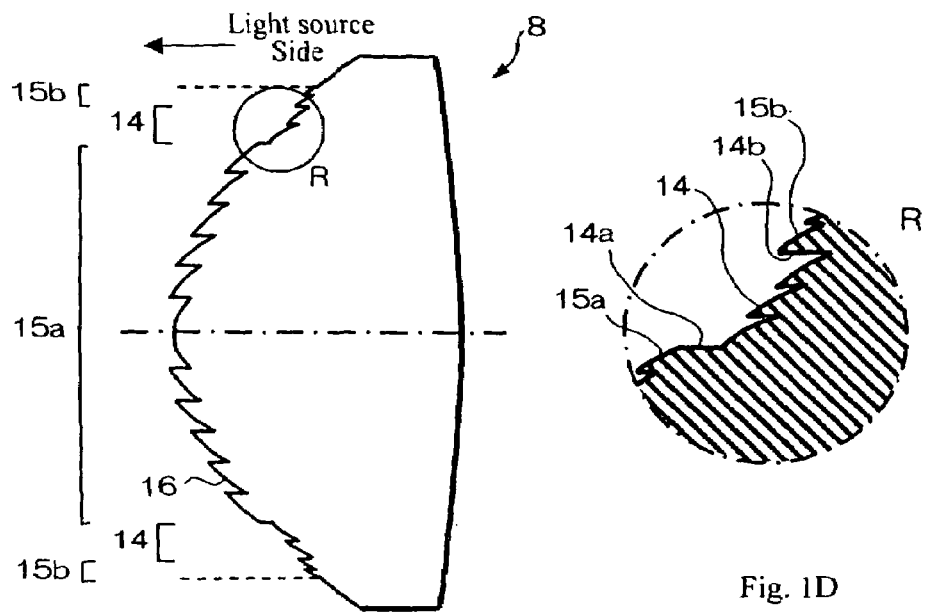
Fig. 1A
Fig. 1D
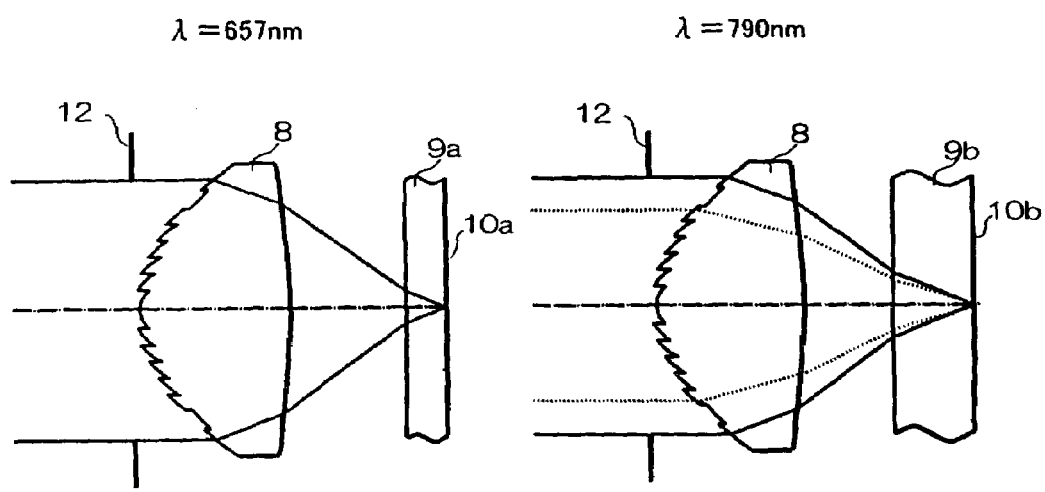
λ = 657nm
λ = 790nm
Fig. 1B
Fig. 1C

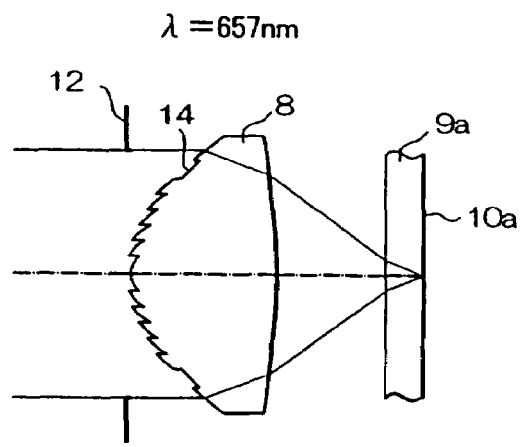
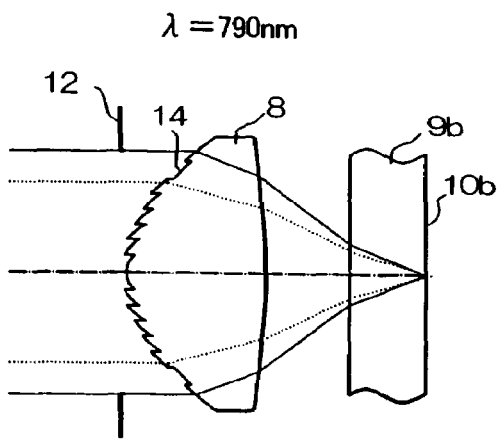
Fig. 3A    Fig. 3B
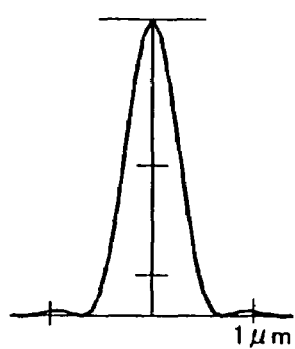
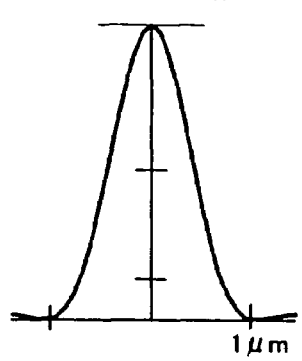
Fig. 4A    Fig. 4B
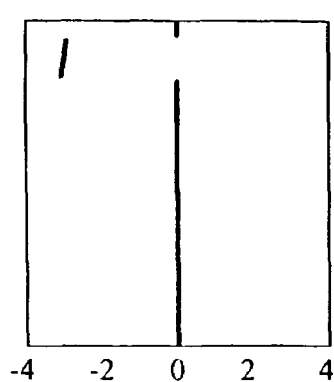
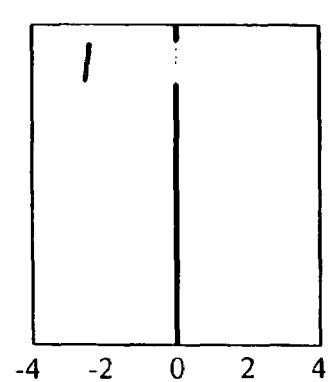
Fig. 5A    Fig. 5B

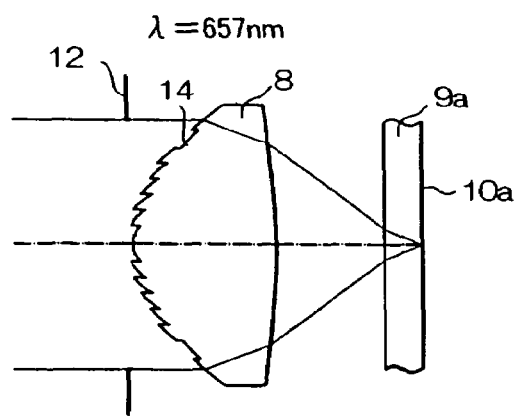
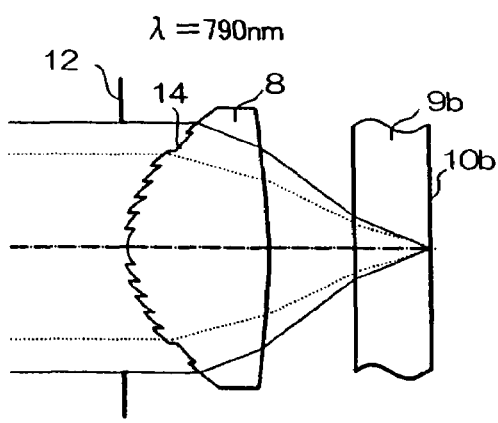
Fig. 9A
Fig. 9B
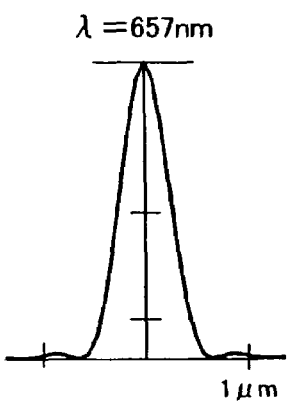
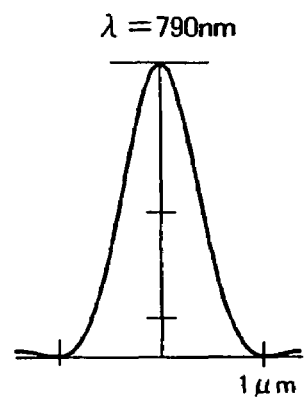
Fig. 10A
Fig. 10B
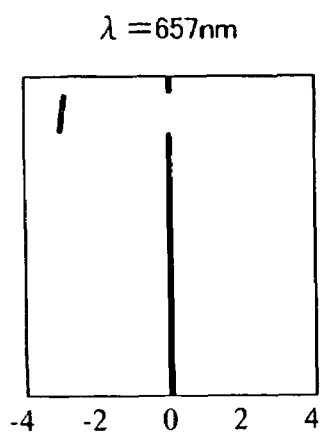
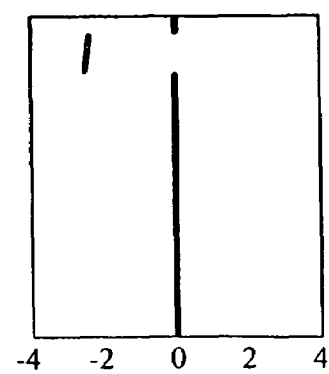
Fig. 11A
Fig. 11B

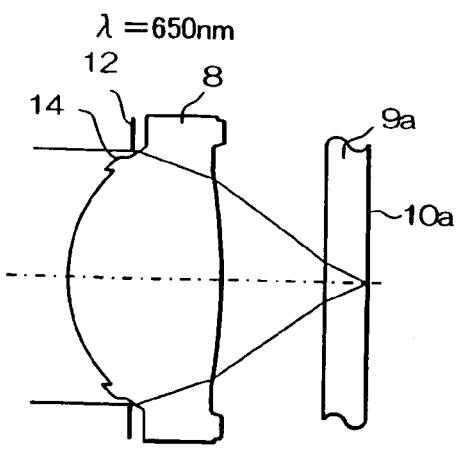 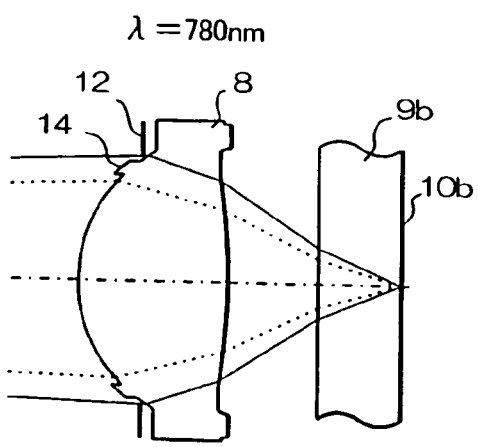
Fig. 30A　　　　　　　　　Fig. 30B
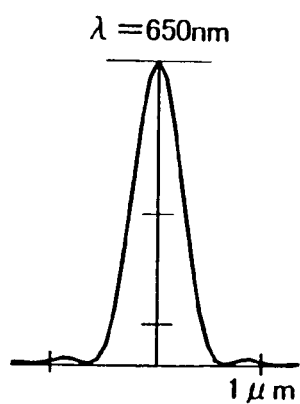 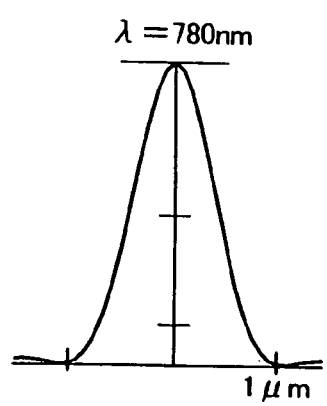
Fig. 31A　　　　　　　　　Fig. 31B
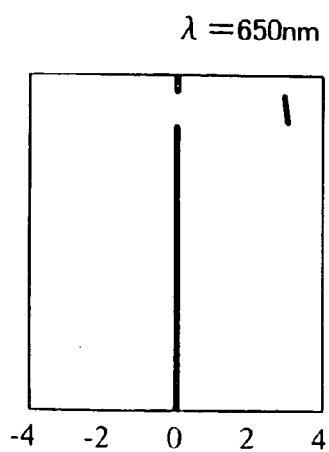 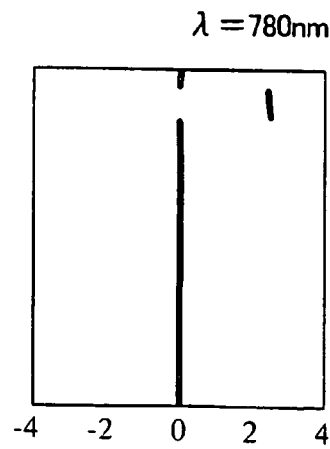
Fig. 32A　　　　　　　　　Fig. 32B NA 0.6 ( $\lambda$ = 650nm)

NA 0.6 ( $\lambda$ = 657nm)

NA 0.45 ( $\lambda$ = 780nm)

NA 0.45 ( $\lambda$ = 790nm)

NA 0.46 ( $\lambda$ = 790nm)

NA 0.475 ( $\lambda$ = 790nm)

NA 0.5 ( $\lambda$ = 790nm)

OPTICAL RECORDING MEDIA OBJECTIVE LENS AND OPTICAL PICKUP DEVICE USING IT

BACKGROUND OF THE INVENTION

Recently, a variety of optical recording media have been developed and an optical pick-up device that may be shared by multiple types of optical recording media in order to record and reproduce signals have been manufactured. For example, it is known in the prior art to use a single optical pick-up device with either a DVD (Digital Versatile Disk) or a CD (Compact Disk including CD-ROM, CD-R, CD-RW) in order to record and reproduce signals. For these two optical recording media, the DVD uses visible light having a wavelength of approximately 657 nm for improved recording densities while the CD is required to use infrared light having a wavelength of approximately 790 nm because some recording media are insensitive to visible light. The optical pick-up device shared by these two recording media uses illumination light of two different peak wavelengths.

The two optical recording media described above require different numerical apertures due to their different features. For example, the DVD is standardized to use a numerical aperture of 0.6 and the CD is standardized to use a numerical aperture in the range of 0.45-0.52. In prior art devices different numerical apertures are used depending on the optical recording media, and all aperture diaphragm, such as a liquid crystal shutter or a wavelength selective filter, may be used to achieve the different numerical apertures. Alternatively, multiple diaphragms may be interposed to achieve the different numerical apertures.

However, the prior art techniques as described above increase the size of the device, as well as increase its complexity and cost.

The inventors of the present application has previously disclosed in Japanese Patent Application 2002-156854 an objective lens that has a zonal part on one of lens surface at the outermost periphery thereof and that has a certain depth (or height) so as to apparently eliminate the light of one of tile wavelengths at the flux periphery and while maintaining the light of the outer wavelength. This objective lens eliminates the need for diaphragms, as provided in the prior art, and results in a downsized optical pickup device that can be produced at a reduced cost.

The objective lens as described in Japanese Patent Application 2002-156854 has a circumferential stepped part at the boundary between the outermost peripheral area and an area inside thereof on one surface (with a depth, for example, equal to $(2n+1)\lambda/2$) for one of the wavelengths $\lambda$, with n being an integer) so as to form a zonal part on one of the surfaces of the objective lens at the outermost peripheral area and thereby substantially reduce the numerical aperture at the periphery for one of the wavelengths. However, this structure limits the position of the stepped part to a point corresponding to a difference in numerical apertures between two optical recording media (i.e., to at a certain distance from the optical axis). In other words, in order to apparently eliminate the intensity of light at the periphery due to interference effects, the stepped part should be provided nearly at the center of the region that contributes light to cause the destructive interference.

The structure above does not give freedom of design with regard to the position at which the stepped part is formed. Therefore, it is difficult to design a lens having improved optical performance. Consequently, a beam profile corresponding to a required numerical aperture may in some cases not be obtainable. Prior art optical recording media objective lenses having three zonal parts are described for example in Japanese Laid-Open Patent Applications H09-145994, H09-145995, and H09-197108. However, the zonal parts are not for producing an interference effect and the two outer zonal parts converge light fluxes having different wavelengths from each other onto different predetermined points. Thus, the basic technical concepts differ from the present invention.

BRIEF SUMMARY OF THE INVENTION

The present invention relates to an optical recording media objective lens used with two different optical recording media that require different numerical apertures and working wavelengths, and enables efficient converging of the working lights on the corresponding optical recording media so as to record and/or reproduce information, and an optical pick-up device rising it. More precisely, the present invention relates to an optical recording media objective lens that uses interference effects so as to obtain the corresponding numerical apertures required for the two different optical recording media and an optical pick-up device using it.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 1A-1D are schematic diagrams that depict cross-sectional views of the optical recording objective lens of an embodiment of the present invention, with FIG. 1A showing the objective lens, with FIG. 1B showing the operation of the objective lens when used with recording medium 9a, with FIG. 1C showing the operation of the objective lens when used with a different recording medium 9b, and with FIG. 1D showing an enlarged, partial cross-sectional view of the surface of the objective lens of FIG. 1A that is within the circled region shown in FIG. 1A;

FIGS. 3A and 3B illustrate ray paths for the optical recording media objective lens according to Embodiment 1 of the present invention, with FIG. 3A showing the operation of the objective lens during DVD recording/reproducing and FIG. 3B showing the operation of the objective lens during CD-R recording/reproducing;

FIGS. 4A and 4B illustrate the intensity profiles of the light after being imaged to a spot by the optical recording media objective lens according to Embodiment 1 of the present invention, with FIG. 4A being the light intensity profile of the spot used for DVD recording/reproducing and FIG. 4B being the light intensity profile of the spot used for CD-R recording/reproducing;

FIGS. 5A and 5B illustrate the wavefront aberrations of the light collected by the optical recording media objective lens of Embodiment 1 of the present invention, with FIG. 5A being the wavefront aberration for DVD recording/reproducing and with FIG. 5B being the wavefront aberration for CD-R recording/reproducing;

FIGS. 9A and 9B illustrate ray paths for the optical recording media objective lens according to Embodiment 3 of the present invention, with FIG. 9A showing the operation of the objective lens during DVD recording/reproducing and FIG. 9B showing the operation of the objective lens during CD-R recording/reproducing;

FIGS. 10A and 10B illustrate intensity profiles of the light after being imaged to a spot by the optical recording media objective lens according to Embodiment 3 of the present invention, with FIG. 10A being the light intensity profile of the spot used for DVD recording/reproducing and FIG. 10B being the light intensity profile of the spot used for CD-R recording/reproducing;

FIGS. 11A and 11B illustrate the wavefront aberrations of the light collected by the optical recording media objective lens of Embodiment 3 of the present invention, with FIG. 11A being the wavefront aberration for DVD recording/reproducing and with FIG. 11B being the wavefront aberration for CD-R recording/reproducing;

FIGS. 30A and 30B illustrate ray paths for the optical recording media objective lens according to Embodiment 10 of the present invention, with FIG. 30A showing the operation of the objective lens during DVD recording/reproducing and FIG. 30B showing the operation of the objective lens during CD-R recording/reproducing;

FIGS. 31A and 31B illustrate intensity profiles of the light after being imaged to a spot by the optical recording media objective lens according to Embodiment 10 of the present invention, with FIG. 31A being the light intensity profile of the spot used for DVD recording/reproducing and FIG. 31B being tile light intensity profile of the spot used for CD-R recording/reproducing;

FIGS. 32A and 32B illustrate the wavefront aberrations of the light collected by the optical recording media objective lens of Embodiment 10 of the present invention, with FIG. 32A being the wavefront aberration for DVD recording/reproducing and with FIG. 32B being the wavefront aberration for CD-R recording/reproducing;

DETAILED DESCRIPTION

Figure 2:
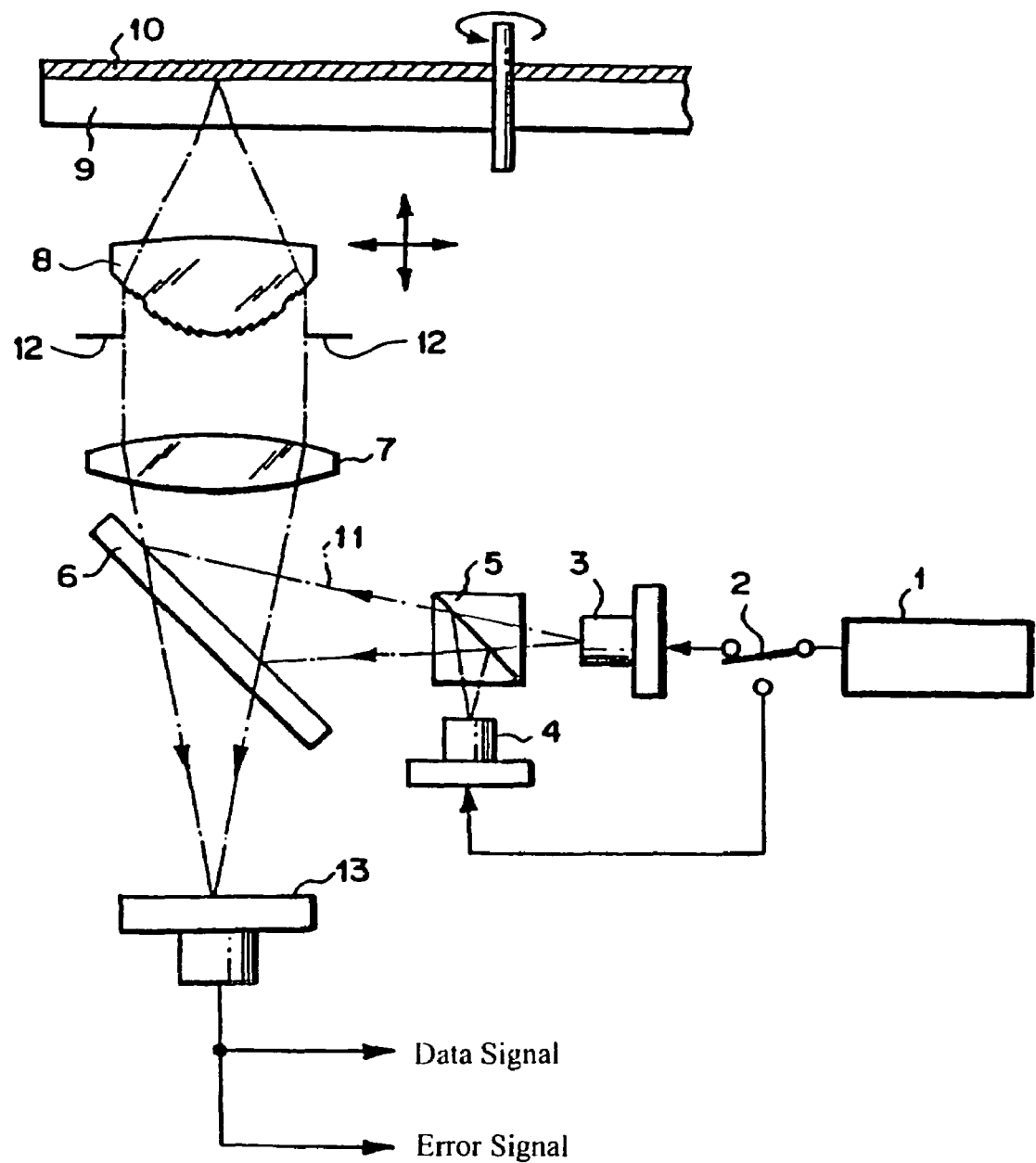
FIG. 2 is a schematic diagram of an optical pick-up device using the optical recording media objective lens of an embodiment of the present invention.

The present invention relates to an optical recording media objective lens that, in a compact and inexpensive manner, does not make the structure of an optical pick-up device more complex and that allows for more freedom of optical design, utilizes optical interference effects to obtain two different numerical apertures corresponding to different optical recording media having different specifications, and an optical pick-up device using it.

The optical recording media objective lens of the present invention is for converging working light corresponding to a first numerical aperture and a first wavelength onto a first optical recording medium at a first predetermined point and for converging working light corresponding to a second numerical aperture and a second wavelength onto a second optical recording medium at a second predetermined point for recording or reproducing information.

The invention is characterized by:
(a) the objective lens having an aperture adjusting zonal part on at least one of its lens surfaces for apparently eliminating the light at the periphery of a light flux having a wavelength $\lambda 1$ and maintaining the light amount at the periphery of a light flux having a wavelength $\lambda 2$, where $\lambda 1$ is one of the first and second wavelengths and $\lambda 2$ is the other wavelength; and
(b) the zonal part is formed between two concentric stepped parts that are positioned about the optical axis of the objective lens in a manner such that light that passes through the area corresponding to the zonal part when the zonal part is actually absent versus the light that passes through the zonal part satisfy the following Conditions (1) and (2):

$$\Delta_1 = (2n+1)\cdot\lambda_1/2 + \delta_1 \qquad \text{Condition (1)}$$

$$\Delta_2 = m\cdot\lambda_2 + \delta_2 \qquad \text{Condition (2)}$$

where
$\Delta_1$ is the difference in optical path length from the light source to the focus point of the optical recording media objective lens for light having the wavelength $\lambda_1$ that would pass through the area where the zonal part would be if the zonal part were to be removed from the optical recording media objective lens versus the light passing through the zonal part;

$\Delta_2$ is the difference in optical path length from the light source to the focus point of the optical recording media objective lens for light having the wavelength $\lambda_2$ that would pass through the area where the zonal part would be if the zonal part were to be removed from the optical recording media objective lens versus the light passing through the zonal part;

m and n are integers,

δ1 is a constant within the range $|\delta_1| \leq 0.25\, \lambda_1$, and

δ2 is a constant within the range $|\delta_2| \leq 0.25\, \lambda_2$.

The two stepped parts have outer diameters that lie between the light flux diameters corresponding to the first and second numerical apertures, and it is desirable that an optical diffractive surface be provided on at least one surface.

It is more desirable that the constants $\delta_1$ and $\delta_2$ in Conditions (1) and (2) above lie within the following more narrow ranges:

$|\delta_1| \leq 0.2\, \lambda_1$ $|\delta_2| \leq 0.2\, \lambda_2$

It is also desirable that the following Condition (3) be satisfied:

$$0.95 \leq (a+c)/b \leq 1.05 \qquad \text{Condition (3)}$$

where a is the distance in a direction orthogonal to the optical axis between the boundary of the smaller one of the first and second numerical apertures and the inner one of the two stepped parts, b is the distance in a direction orthogonal to the optical axis between the inner stepped part and tile outer stepped part, and c is the distance in a direction orthogonal to the optical axis between the outer stepped part and the boundary of the larger one of the first and second numerical apertures.

In addition to satisfying Condition (3) above, it is further desirable that the following Condition (4) be satisfied:

$$0.95 \leq a/c \leq 1.05 \qquad \text{Condition (4)}$$

where a and c are as defined above.

Also, it is further desired that the following Condition (5) is satisfied:

$$0.90 \leq (A+C)/B < 1.10 \qquad \text{Condition (5)}$$

where

A is the area projected onto a plane that is orthogonal to the optical axis of the region between the boundary of the smaller one of the first and second numerical apertures and the inner one of the two stepped parts, B is the area projected onto a plane that is orthogonal to the optical axis of the region between the inner stepped part and the outer one of the two stepped parts, and C is the area projected onto a plane that is orthogonal to the optical axis of the region between the outer stepped part and the boundary of the larger one of the first and second numerical apertures.

It is further desired that the following Condition (6) be satisfied:

$$0.90 \leq A/C \leq 1.10 \qquad \text{Condition (6)}$$

where

A and C are as defined above.

It is also desirable, in the optical recording media objective lens described above, that the optical diffractive surface and the zonal part are provided on one and the same lens surface and that the optical diffractive surface produces a phase difference of an integral multiple of $2\pi$ radians at the two stepped parts.

The optical pick-up device of the present invention is characterized by comprising the optical recording media objective lens described above.

As described above, in the optical recording media objective lens of the present invention, the zonal part for substantially reducing the numerical aperture for one of the wavelengths is formed by two concentric stepped parts on a surface of the objective lens and positioned about the optical axis of the objective lens, and the two stepped parts have outer diameters between the diameter of the light flux at said surface corresponding to the first numerical aperture for one of the optical recording media and the diameter of the light flux at said surface corresponding to the second numerical aperture for the other optical recording With the two stepped parts being formed in the area as discussed above so as to constitute a zonal part, the zonal part is located at a surface of the objective lens between the outer diameters of the incident light fluxes corresponding to the two numerical apertures. On the other hand, the zonal part can be at any position within the area discussed above, since it does not matter where the zonal part is formed within the area effective for the elimination so as to apparently eliminate, due to the interference effect, the light of a light flux in a region having a diameter between the two numerical apertures.

With the structure as described above, more freedom is given to the position at which the zonal part is formed, facilitating the designing of a lens having improved optical performance. Consequently, improved optical performance can be obtained while allowing for the two numerical apertures to be obtained for the two different incident wavelengths of light.

The optical recording media objective lens of the present invention has an inner part and an outer part on either side of the zonal part. Thus, it has a total of three zonal parts.

The invention will first be discussed in general terms with reference to FIG. 1 which shows the geometry of the optical recording media objective lens of Embodiment 1 of the invention. FIG. 2 shows an optical pick-up device using the optical recording media objective lens of Embodiment 1.

As shown in FIG. 2, a laser beam 11 that is emitted by a selected one of the semiconductor lasers 3 and 4 is reflected by a half mirror 6, collimated by a collimator lens 7, and converged by an optical recording media objective lens 8 so as to be incident onto a recording area 10 of an optical recording medium 9. The semiconductor laser 3 emits an infrared laser beam having a wavelength of approximately 790 nm ($\lambda_1$) for CDs such as CD-R (recordable optical recording media) (hereafter representatively termed CD-R). The semiconductor laser 4 is a light source that emits a visible laser beam having a wavelength of approximately 657 nm ($\lambda_2$) for DVDs. The laser beam 11 that is emitted by either one of the semiconductor lasers 3 and 4 reaches a half mirror 6 formed within, for example, a beam splitter prism 5. A selector switch 2 is provided between the power source 1 and semiconductor lasers 3 and 4. The switch 2 is operated so as to selectively supply power to either one of the semiconductor lasers 3 and 4 but not to both simultaneously. Furthermore, a diaphragm 12 is provided on the light source side of the objective lens 8.

With the optical pick-up device of this embodiment, either one of a CD-R or DVD optical recording medium 9 is available for recording and reproducing of signals. The recording area 10 of the optical recording medium 9 has tracks of pits that carry signal information. The reflected light of the laser beam 11 from the recording area 10 carries signal information that enters the half mirror 6 via the objective lens 8 and collimator lens 7. Light that is transmitted through the half mirror 6 then enters a four-quadrant photodiode 13 that is used to detect electrical signals in each of four quadrants. An operation means (not-showing) then obtains data signals as well as focusing and tracking en-or signals from the signals detected by the four-quadrant photodiode 13.

The half mirror 6 is positioned in the return optical path from the optical recording medium 9 so that its surface makes an angle of about 45 degrees with the central rays of the incident light. Therefore, the half mirror 6 has the same effect as a cylindrical lens and the light beam transmitted through it has astigmatism. The magnitude of the focusing error is determined depending on the return beam, light spot profile on the four-quadrant photodiode 13. The collimator lens 7 call be eliminated depending on the given situation. Also a grating can be positioned in all optical path between the semiconductor lasers 3 and 4 and the half mirror 6 so as to use three light beams for detecting the tracking error.

The objective lens 8 of this embodiment is characterized by a zonal part 14 being formed on a first surface 16 at the periphery which is on a different level from that of an inner part 15a and an outer part 15b as shown in FIGS. 1A and 2. FIG. 1D is an enlarged cross-sectional view of the encircled part R shown in FIG. 1A, and shows a partial structure of the first surface 16 of the objective lens 8. FIG. 1D slows two stepped parts 14a and 14b that form the boundaries of the zonal part 14 on the first surface 16 of the objective lens 8. Here, the level differences are shown in an exaggerated manner in order to clearly illustrate the different levels among the zonal part 14, the inner part 15a and the outer part 15b. The lens surfaces are defined using the following a spherical equation:

$$Z=[(C \cdot Y^2)/\{1+(1-K \cdot C^2 \cdot Y^2)^{1/2}\}]+\Sigma A_i \cdot Y^{2i}+B \qquad \text{Equation (A)}$$

where

Z is the length (in mm) of a line drawn from a point on the a spheric lens surface at a distance Y from the optical axis to the tangential plane of the a spheric surface vertex, C is the curvature (=1/the radius of curvature, R) of the a spheric lens surface on the optical axis, Y is the distance (in mm) from the optical axis, K is the eccentricity, $A_i$ is an a spheric coefficient, with the summation extending over i, and B is a constant.

As described above, the CD-R and DVD use light beams having different numerical apertures for recording/reproducing. The former uses a numerical aperture of approximately 0.45 and the latter uses a numerical aperture of approximately 0.60. The zonal part 14 ensures a proper numerical aperture for each optical recording medium 9. The zonal part 14 is formed so that, among wavelengths of the laser beam 11 corresponding to the optical recording medium 9, the light at the periphery of a light flux having one of the wavelengths is apparently eliminated due to destructive interference while light at the periphery of the light flux having the other wavelength is maintained. Light waves of wavelength 790 nm ($\lambda_1$) passing inside and outside the zonal part 14 and through the zonal part 14 destructively interfere with each other, thereby apparently eliminating the light intensity at the periphery of the light flux. On the other hand, the zonal part 14 has the stepped parts 14a and 14b that do not cause destructive interference of light having the wavelength 657 nm ($\lambda_2$) between the light passing inside and outside the zonal part 14 and the light passing through the zonal parts 14, thereby maintaining the light intensity of wavelength 657 nm at the periphery of the light flux.

A certain difference in optical path length between the light passing through the zonal part 14 and the light passing inside and outside the zonal part 14 leads to destructive interference for light of wavelength $\lambda_1$ that attenuates the light intensity in the periphery for this wavelength Thus, light having a wavelength $\lambda_1$ is subject to destructive interference due to there being a phase difference of an odd-number multiple of $\lambda_1/2$, and the light having a wavelength $\lambda_2$ is subject to a phase difference of an integral multiple of $\lambda_2$ wavelengths. However, because the light spot has a Gaussian distribution, it is preferred that there be a phase difference margin of $\delta_1$ and $\delta_2$, respectively, as noted above (i.e., with the values of $\delta_1$ and $\delta_2$ being 25% or, more desirably, 20% of the respective wavelength, as noted above). In other words, the stepped parts 14a and 14b should produce phase differences that satisfy the above Conditions (1) and (2).

Assuming that the numerical aperture for the light having a wavelength of 790 nm ($\lambda_1$) is 0.45 and the numerical aperture for the light having a wavelength of 657 nm ($\lambda_2$) is 0.6, the zonal part 14 is formed of two concentric stepped parts 14a and 14b about the optical axis of the objective lens 8. The two stepped parts 14a and 14b have diameters on the lens surface that lie between the diameters that correspond to light fluxes having numerical apertures of 0.45 and 0.6 for the wavelengths 790 nm ($\lambda_1$) and 657 nm ($\lambda_2$), respectively.

As for the light having a wavelength of 790 nm ($\lambda_1$), the light passing through the zonal part 14 and the light passing through the inner and outer parts 15a and 15b interfere with each other due to the phase difference being an odd-numbered multiple of $\lambda_1/2$, which eliminates the intensity of light at the periphery of a light flux so as to form a light flux having a numerical aperture of 0.45. On the other hand, as for light having a wavelength of 657 nm ($\lambda_2$), the light passing through the zonal part 14 and the light passing through the inner and outer parts 15a and 15b do not undergo destructive interference, and thus the original numerical aperture of 0.6 for the objective lens 8 is maintained for the wavelength $\lambda_2$.

As shown in FIG. 1B, with the zonal part 14 provided on a surface of the objective lens 8, the laser beam 11 having a wavelength of 657 nm ($\lambda_2$) emitted from the semiconductor laser 4 is nearly collimated by the collimator lens 7 and enters the objective lens 8 when a DVD 9a is placed at a certain position (on a turntable) for recording/reproducing. Then, the incident laser beam 11 is converged by the objective lens 8 on the recording area 10a of the DVD 9a with a numerical aperture of 0.6.

On the other hand, as shown in FIG. 1C, the laser beam 11 having a wavelength of 790 nm ($\lambda_1$) that is emitted from the semiconductor laser 3 enters the objective lens 8 when a CD-R 9b is placed at a certain position (on a turntable) for recording/reproducing. The incident laser beam 11 is then converged by the objective lens 8 onto the recording area 10b of the CD-R 9b with a numerical aperture of 0.45 because destructive interference caused by the zonal part 14 eliminates the light flux at the periphery.

It is sufficient for this embodiment that the zonal part 14 is sized between the numerical apertures 0.45 and 0.6 for light having wavelengths of 790 nm ($\lambda_1$) and 657 nm ($\lambda_2$), respectively. Theoretically, it does not matter whether the zonal part 14 is positioned closer to the numerical aperture 0.45 or closer to the numerical aperture 0.6. However, it is desired in practice that the above Conditions (4) or (6) be satisfied, since more freedom is thereby given to the position of the zonal parts 14. This facilitates the designing of a lens having improved optical performance and yields significant practical efficacy.

The zonal part 14 needs to cause destructive interference between the light passing inside and outside the zonal part 14 and the light passing through the zonal part 14 so as to substantially eliminate the light at the periphery of a light flux. Thus, it is desired that the zonal part 14 satisfy the above Condition (3) and, for improved optical performance, it is further desired that the zonal part satisfy the above Condition (4).

Excellent results were obtained experimentally by satisfying the above Conditions (3) and (4) in designing the zonal parts 14. However, one may instead design the zonal part 14 so as to satisfy the above Condition (5). When designing the zonal part 14 using Condition (5), improved optical performance can be obtained by ensuring that the above Condition (6) is also satisfied.

When an optical diffraction surface is provided on the objective lens 8, it is preferred that the optical diffractive surface and the zonal part 14 are formed on at least one and the same surface, and that the optical diffractive surface produces a phase difference of an integral multiple of $2\pi$ radians at the stepped parts 14a and 14b so as to not disturb the wavefront at these stepped parts even though the a spherical surface is discontinuous, as described above.

Figure 40A:
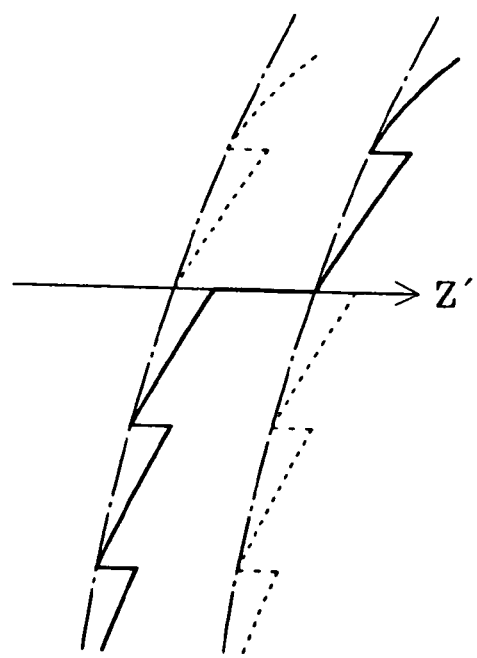
FIGS. 40A and 40B are schematic diagrams to show two different phase differences at the stepped part of the optical diffractive surface, wherein the phase difference is an integral multiple of $2\pi$ radians in FIG. 40A but not all integral multiple of $2\pi$ radians in FIG. 40B.
Figure 40B:
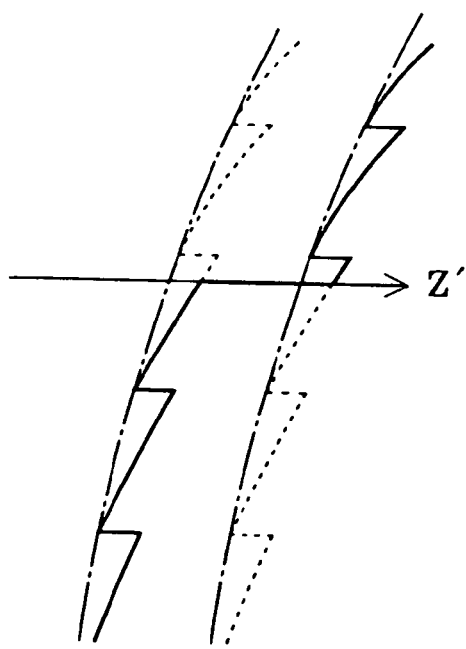

FIG. 40A schematically illustrates the phase difference on the optical diffractive surface at the stepped part being an integral multiple of $2\pi$ radians. FIG. 40B schematically illustrates the phase difference on the optical diffractive surface at the stepped part not being an integral multiple of $2\pi$ radians. In FIGS. 40A and 40B, the solid lines indicate the lens geometry, with the stepped parts having different depths in the direction Z' that is parallel to the optical axis. For convenience of illustration, the surface profile of the Fresnel surface is spherical.

The optical recording medium 9 has a protective layer made of a PC (polycarbonate) for both CD-R and DVD recording media. A CD-R, including the protective layer, has a standardized geometric thickness of 1.2 mill. A DVD, including the protective layer, has a standardized geometric thickness of 0.6 mill. Due to a difference in thickness of the protective layer for these two optical recording media, the spherical aberrations that are generated differ in magnitude. To ensure the proper focusing, this requires different converging effects of the objective lens depending on the wavelength of light used. Hence, it is desired in the optical recording media objective lens of the present invention that an optical diffractive surface be provided on at least one of the lens surfaces so as to correct aberrations more efficiently in recording/reproducing on optical recording media. Needless to say, the optical recording media objective lens of the present invention can be formed without an optical diffractive surface. For example, this is possible where light from the light source is allowed to enter the objective lens in a slightly diverged state for one of the optical recording media, as in Embodiments 9 to 12 to be described in detail below. However, those embodiments in which an optical diffractive Surface is provided on the light source side of the optical recording media objective lens are the most preferred embodiments of the present invention, as in Embodiments 1 to 8 which will be described in detail below.

As shown in FIG. 1A, an optical diffractive surface consisting of a concentric grating integrally formed with the lens material and having a serrated cross section is provided on the light-source side surface (hereinafter termed the first surface) of the objective lens 8 so as to ensure excellent recording/reproducing on either CD-R or DVD optical recording media 9. In FIG. 1A, as well as for the other figures that show a cross-sectional view, the serrated surface is shown in an exaggerated manner in order to clarify the optical diffractive surface.

The optical diffractive surface exhibits a high diffraction effect for light having the first wavelength and converges this light flux at a first predetermined position in conjunction with the refractive power of the objective lens 8. On the other hand, the optical diffractive surface exhibits a low diffraction effect for light having the second wavelength and converges this light flux at a second predetermined position in conjunction with the refractive power of the objective lens. The low diffraction effect includes zero-order diffraction (i.e., 100% zero order diffracted light). In such a case, the light having the second wavelength converges at the second predetermined position due to the refractive power of the objective lens 8.

Here, the first wavelength $\lambda_1$, corresponds to the wavelength of 790 nm for the CD-R and the second wavelength $\lambda_2$ corresponds to the wavelength of 657 nm for the DVD. An optical diffractive surface converges the first order diffracted light of these wavelengths at the corresponding recording areas in conjunction with the refractive power of the objective lens 8. The optical diffractive surface adds a difference in optical path length equal to $\lambda \cdot \Phi/(2\pi)$ to the diffracted light, where $\lambda$ is the wavelength and $\Phi$ is the phase difference function of the optical diffractive surface. The phase difference function $\Phi$ is given by the following equation:

$$\Phi = \Sigma W_i \cdot Y^{2i} \qquad \text{Equation (B)}$$

where

Y is distance from the optical axis; and $W_i$ is a phase difference coefficient, with the summation extending over i.

The grating pitch of the optical diffractive surface is determined by the phase difference function. The height of the serrated steps of the optical diffractive surface determines the percentage of light diffracted into each diffractive order. The largest diameter of the optical diffractive surface determines the numerical apertures and beam diameters of the incident laser beam 11 for the two wavelengths $\lambda_1$ and $\lambda_2$.

The effect of the optical diffractive surface will now be described with reference to FIGS. 1B and 1C. FIGS. 1B and 1C relate to the objective lens 8 of Embodiments 1 to 8, which are described later. As shown in FIG. 1B, with the DVD 9a being placed at a predetermined position (i.e., on a turntable) as the optical recording medium 9 for recording/reproducing, a laser beam 11 having a wavelength of 657 nm ($\lambda_2$) that is emitted from the semiconductor laser 4 and is substantially collimated by the collimator lens 7 enters the objective lens 8 and is converged by it onto the recording area 10a of the DVD 9a.

On the other hand, as shown in FIG. 1C, with the CD-R 9b being placed at a predetermined position (i.e., on the turntable) as the optical recording medium for recording/reproducing, a laser beam 11 having a wavelength of 790 nm ($\lambda_1$) that is emitted from the semiconductor laser 3 and is substantially collimated by the collimator lens 7 enters the objective lens 8. The incident laser beam 11 is converged by the objective lens 8 on the recording area 10b of the CD-R 9b.

The objective lens 8 having the optical diffractive surface on the first surface and a spherical surfaces on both surfaces satisfactorily corrects aberrations for either optical recording media, the CD-R 9b or the DVD 9a that is used, thus ensuring proper focusing and excellent recording/reproducing.

The laser beam 11 from the semiconductor laser 3 or 4 converges onto the recording area of the corresponding recording medium 9 a light spot having its aberrations corrected in either case due to the a spherical geometry formed on both Surfaces of the objective lens 8 and the effect of tile optical diffractive surface. The difference in magnitude of the spherical aberration is mainly due to tile difference in disk thickness for the two different types of optical recording media; however, the difference in wavelength of the incident light is also somewhat responsible. Both sources of aberrations are effectively corrected by the optical diffractive surface.

The optical recording media objective lens 8 described above has a certain zonal part 14 for adjusting the aperture on the first surface. This allows the different optical recording media having different recording specifications, namely, CD-R versus DVD, to be illuminated by a light beam having a proper numerical aperture in a compact and inexpensive manner without making the structure of the optical pick-up device more complex, such as when using an aperture diaphragm that is formed, for example, of a liquid crystal shutter and a wavelength selective filter that is interposed, or by using multiple diaphragms that are mechanically switched into the light path. Instead, in the present invention, an optical diffractive surface that is formed on the first surface 16 is used to optimize the spherical aberration for wavelengths corresponding to the different optical recording media having different specifications and thus ensures proper convergence of the illumination light for excellent recording/reproduction.

The optical recording media objective lens 8 described above has a certain optical diffractive surface on the first surface 16 and a certain zonal part 14 for adjusting the aperture on the first surface 16. In other designs, both the optical diffractive surface and zonal part 14 can be formed on the surface on the optical recording media side, i.e., on the second surface. Alternatively, one of the optical diffractive surface and zonal part 14 can be formed on the light source side and the other on the optical recording media side. Theoretically, the same effect as obtained for this embodiment can be obtained with an appropriate geometrical design of the optical diffractive surface and zonal parts 14.

The optical recording media objective lens 8 of the present invention will now be described in detail for several embodiments using Tables that define the construction and performance of the objective lens for each embodiment. In Embodiments 1-8, both surfaces of the objective lens are a spheric and an optical diffractive surface is also provided superimposed on the first surface 16. In Embodiments 9-12, both surfaces of the objective lens 8 are a spheric, but there is no superimposed optical diffractive surface. Each objective lens 8 is suitable for use with two different optical recording media having different specifications, such as CD-R versus DVD recording/reproducing. In the case of using either recording medium, a laser beam halving a proper wavelength for the recording medium used is accurately converged by the objective lens 8 onto the recording area of the corresponding optical recording medium.

In the top portion of Tables 1, 4, 7, 10, 13, 16, 19, 22, 25, 27 29 and 31 that follow are listed the surface #, in order from the light source side, the surface type or radius of curvature, the on-axis distance (in mm) between surfaces for the two used wavelengths ($\lambda$=657 nm for the DVD 9a, and 790 nm for a CD-R 9b) and the refractive index at the two used wavelengths for each respective embodiment. In the bottom portion of each of these same tables is listed, for each used wavelength, the diaphragm diameter $\Phi$ (in mm), the focal length (in mm), the numerical aperture NA and the apparent light source position (as measured from the first surface).

In each of Tables 2, 5, 8, 11, 14, 17, 20, 23, 26, 28, 30, and 32 that follow are listed the Coefficients of the A spherical Equation for the surfaces indicated for the respective Embodiments 1-12. Coefficients not listed are zero. Where so indicated, a particular surface may have different a spherical coefficients in different regions thereon depending on the value of the distance Y from the optical axis. An "E" in the data indicates that the number following the "E" is the exponent to the base 10. For example, "1.0E-2" represents the number $1.0 \times 10^{-2}$.

In each of Tables 3, 6, 9, 12, 15, 18, 21, and 24 that follow are listed the coefficients of the phase difference function $W_i$ for the respective Embodiments 1-8. Coefficients not listed are zero. Once again, an "E" in the data indicates that the number following the "E" is the exponent to the base 10. For example, "1.0E-2" represents the number $1.0 \times 10^{-2}$.

EMBODIMENT 1

TABLE 1

| # | Surface Type or Radius of Curvature | Surface Spacing | | Refractive Index | |
|---|---|---|---|---|---|
| | | $\lambda$ = 657 nm | $\lambda$ = 790 nm | $\lambda$ = 657 nm | $\lambda$ = 790 nm |
| 1 | diffractive, aspherical | 2.220 | 2.220 | 1.50566 | 1.50222 |
| 2 | aspherical | 1.705 | 1.340 | 1.00000 | 1.00000 |
| 3 | ∞ | 0.600 | 1.200 | 1.58000 | 1.57000 |
| 4 | ∞ | | | | |

| | $\lambda$ = 657 nm | $\lambda$ = 790 nm |
|---|---|---|
| Diaphragm diameter, $\Phi$ | 4.00 | 4.00 |
| Focal length | 3.33 | 3.35 |
| Numerical Aperture, NA | 0.6 | 0.46 |
| Light source position | ∞ | ∞ |

TABLE 2

Coefficients of Aspherical Equation

|   | Surface #1 (Y < 1.653, Y ≧ 1.883) | Surface #1 (1.883 > Y ≧ 1.653) | Surface #2 |
|---|---|---|---|
| C | 5.0071343E−1 | 5.0071343E−1 | −1.4960780E−1 |
| K | 0.0 | 0.0 | 0.0 |
| B | 0.0 | 4.5733280E−3 | 0.0 |
| $A_2$ | 5.4290071E−3 | 5.4290071E−3 | 1.9400336E−2 |
| $A_3$ | 3.8396051E−4 | 3.8396051E−4 | −4.0722384E−3 |
| $A_4$ | −8.9339893E−5 | −8.9339893E−5 | 3.9733112E−4 |
| $A_5$ | 3.1572670E−5 | 3.1572670E−5 | −2.0857683E−5 |
| $A_6$ | −6.2120708E−6 | −6.2120708E−6 |  |

TABLE 3

Coefficients of the Phase Difference Function — Surface #1

| | |
|---|---|
| $W_1$ | 1.7076319E−1 |
| $W_2$ | −1.0935342E+1 |
| $W_3$ | −7.5920175E−1 |

TABLE 3-continued

Coefficients of the Phase Difference Function — Surface #1

| | |
|---|---|
| $W_4$ | −5.5299168E−2 |
| $W_5$ | −4.6256999E−3 |

FIG. 3A shows that a substantially collimated laser beam having a wavelength of 657 nm ($\lambda_2$) enters the objective lens 8 and the incident laser beam is converged by the objective lens 8 onto the recording arc a 10a of the DVD 9a under no substantial influence of the zonal parts 14. FIG. 3B shows that a substantially collimated laser beam having a wavelength of 790 nm ($\lambda_1$) enters the objective lens 8 and the incident laser beam is converged by the objective lens 8 onto the recording area 10b of the CD-R 9b with a smaller numerical aperture after the light flux at the periphery is eliminated due to an interference effect from the zonal parts 14.

FIGS. 4A and 4B illustrate intensity profiles of the light after being imaged to a spot by the optical recording media objective lens according to Embodiment 1 of the present invention, with FIG. 4A being the light intensity profile of the spot used for DVD recording/reproducing and FIG. 43B being the light intensity profile of the spot used for CD-R recording/reproducing. As is apparent from FIGS. 4A and 4B, the objective lens 8 of this embodiment yields accurately focused beam spots having, the required numerical apertures.

FIGS. 5A and 5B show wavefront aberrations of the light beams collected by the objective lens 8 of this embodiment, with FIG. 5A being for the incident illumination as shown in FIG. 3A and FIG. 5B being for the incident illumination as shown in FIG. 3B. As is apparent from FIGS. 5A and 5B, the objective lens 8 causes a certain phase difference due to the zonal part 14 of the lens surface for both the DVD (FIG. 5A) and the CD-R (FIG. 5B).

In this embodiment, the zonal part 14 (1.653≦Y<1.883) is recessed on the light source side and satisfies the above Conditions (3) and (4). The aperture diameter of the smaller numerical aperture, the aperture diameter of the larger numerical aperture, the inner stepped part position, the outer stepped part position, and the values of the Conditions (3) and (4) of this embodiment are given in Table 33.

EMBODIMENT 2

TABLE 4

| # | Surface Type or Radius of Curvature | Surface Spacing $\lambda$ = 657 nm | Surface Spacing $\lambda$ = 790 nm | Refractive Index $\lambda$ = 657 nm | Refractive Index $\lambda$ = 790 nm |
|---|---|---|---|---|---|
| 1 | diffractive, aspherical | 2.220 | 2.220 | 1.50566 | 1.50222 |
| 2 | aspherical | 1.705 | 1.340 | 1.00000 | 1.00000 |
| 3 | ∞ | 0.600 | 1.200 | 1.58000 | 1.57000 |
| 4 | ∞ | | | | |

| | $\lambda$ = 657 nm | $\lambda$ = 790 nm |
|---|---|---|
| Diaphragm diameter, Φ | 4.00 | 4.00 |
| Focal length | 3.33 | 3.35 |
| Numerical Aperture, NA | 0.60 | 0.475 |
| Light source position | ∞ | ∞ |

TABLE 5

Coefficients of the Aspherical Equation

|   | Surface #1 (Y < 1.676, Y ≧ 1.884) | Surface #1 (1.676 ≦ Y < 1.884) | Surface #2 |
|---|---|---|---|
| C | 5.0083036E−1 | 5.0083036E−1 | −1.4937975E−1 |
| K | 0.0 | 0.0 | 0.0 |
| B | 0.0 | −4.6600000E−3 | 0.0 |
| $A_2$ | 5.9007466E−3 | 5.9007466E−3 | 2.2017110E−2 |
| $A_3$ | 2.4237407E−4 | 2.4237407E−4 | −6.1507716E−3 |
| $A_4$ | 1.2093585E−5 | 1.2093585E−5 | 1.0202413E−3 |
| $A_5$ | −1.2296509E−5 | −1.2296509E−5 | −7.5915554E−5 |

TABLE 6

Coefficients of the Phase Difference Function — Surface # 1

| | |
|---|---|
| $W_1$ | 1.7210244E−1 |
| $W_2$ | −1.0939858E+1 |
| $W_3$ | −7.5583406E−1 |
| $W_4$ | −5.6039965E−2 |
| $W_5$ | −4.4295317E−3 |

Figure 6A:
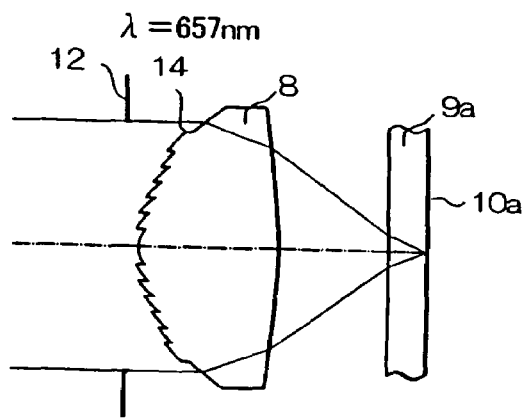
FIGS. 6A and 6B illustrate the ray paths for the optical recording media objective lens according to Embodiment 2 of the present invention, with FIG. 6A showing the operation of the objective lens during DVD recording/reproducing and FIG. 6B showing the operation of the objective lens during CD-R recording/reproducing.
Figure 6B:
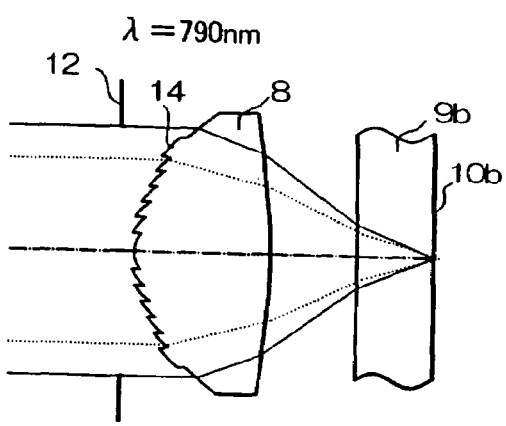

FIG. 6A shows that a substantially collimated laser beam having a wavelength of 657 nm ($\lambda_2$) enters the objective lens 8 and the incident laser beam is converged by the objective lens 8 onto the recording area 10a of the DVD 9a under no substantial influence of the zonal parts 14. FIG. 6B shows that a substantially collimated laser beam having a wavelength of 790 nm ($\lambda_1$) enters the objective lens 8 and the incident laser beam is converged by the objective lens 8 onto the recording area 10b of the CD-R 9b with a smaller numerical aperture after the light flux at the periphery is eliminated due to an interference effect from the zonal parts 14.

Figure 7A:
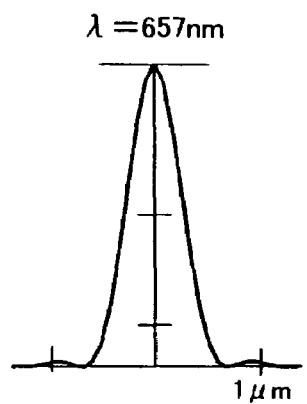
FIGS. 7A and 7B illustrate intensity profiles of the light after being imaged to a spot by the optical recording media objective lens according to Embodiment 2 of the present invention, with FIG. 7A being the light intensity profile of the spot used for DVD recording/reproducing and FIG. 7B being the light intensity profile of the spot used for CD-R recording/reproducing.
Figure 7B:
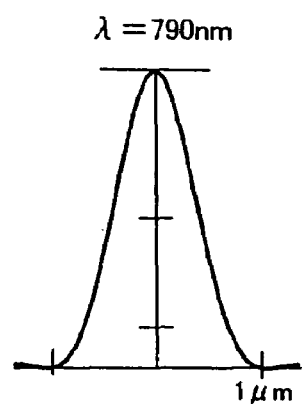

FIGS. 7A and 7B illustrate intensity profiles of the light after being imaged to a spot by the optical recording media objective lens according to Embodiment 2 of the present invention, with FIG. 7A being the light intensity profile of the spot used for DVD recording/reproducing and FIG. 7B being the light intensity profile of tile spot used for CD-R recording/reproducing. As is apparent from FIGS. 7A and 7B, the objective lens 8 of this embodiment yields accurately focused beam spots having the required numerical apertures.

Figure 8A:
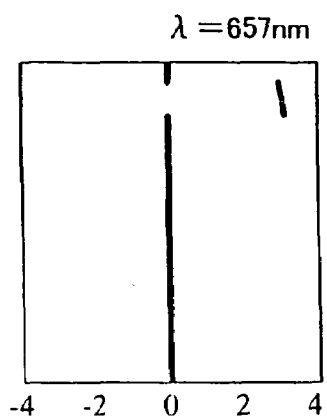
FIGS. 8A and 8B illustrate the wavefront aberrations of the light collected by the optical recording media objective lens of Embodiment 2 of the present invention, with FIG. 8A being the aberration for DVD recording/reproducing and with FIG. 8B being the wavefront aberration for CD-R recording/reproducing.
Figure 8B:
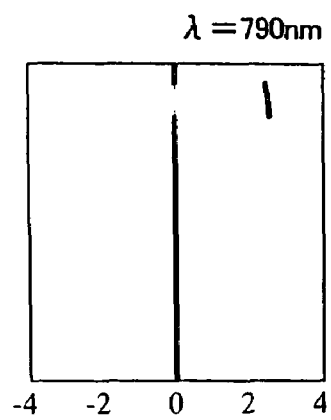

FIGS. 8A and 5B show wavefront aberrations of the light beams collected by the objective lens 8 of this embodiment, with FIG. 8A being for the incident illumination as shown in FIG. 6A and FIG. 8B being for the incident illumination as shown in FIG. 6B. As is apparent from FIGS. 8A and 8B, the objective lens 8 causes a certain phase difference due to the zonal part 14 of the lens surface for both the DVD (FIG. 8A) and the CD-R (FIG. 8B).

In this embodiment, the zonal part 14 (1.676≦Y<1.884) protrudes on the light source side and satisfies the Conditions (3) and (4). The aperture diameter of the smaller numerical aperture, the aperture diameter of the larger numerical aperture, the inner stepped part position, the outer stepped part position, and the values of the Conditions (3) and (4) for this embodiment are given in Table 33.

EMBODIMENT 3

TABLE 7

| # | Surface Type or Radius of Curvature | Surface Spacing $\lambda$ = 657 nm | Surface Spacing $\lambda$ = 790 nm | Refractive Index $\lambda$ = 657 nm | Refractive Index $\lambda$ = 790 nm |
|---|---|---|---|---|---|
| 1 | diffractive, aspherical | 2.220 | 2.220 | 1.50566 | 1.50222 |
| 2 | aspherical | 1.720 | 1.355 | 1.00000 | 1.00000 |
| 3 | ∞ | 0.600 | 1.200 | 1.58000 | 1.57000 |
| 4 | ∞ | | | | |

| | $\lambda$ = 657 nm | $\lambda$ = 790 nm |
|---|---|---|
| Diaphragm diameter, Φ | 4.00 | 4.00 |
| Focal length | 3.33 | 3.35 |
| Numerical Aperture, NA | 0.60 | 0.45 |
| Light source position | ∞ | ∞ |

TABLE 8

Coefficients of the Aspherical Equation

| | Surface #1 (Y < 1.643, Y ≧ 1.892) | Surface #1 (1.643 ≦ Y < 1.892) | Surface #2 |
|---|---|---|---|
| C | 4.9559546E−1 | 4.9559546E−1 | −1.5789498E−1 |
| K | 0.0 | 0.0 | 0.0 |
| B | 0.0 | 4.4825574E−3 | 0.0 |

TABLE 8-continued

Coefficients of the Aspherical Equation

| | Surface #1 (Y < 1.643, Y ≧ 1.892) | Surface #1 (1.643 ≦ Y < 1.892) | Surface #2 |
|---|---|---|---|
| $A_2$ | 5.0656784E−3 | 5.0656784E−3 | 1.9387161E−2 |
| $A_3$ | 1.5769304E−4 | 1.5769304E−4 | −5.5082993E−3 |
| $A_4$ | −2.0984238E−5 | −2.0984238E−5 | 8.4309654E−4 |
| $A_5$ | −1.4120157E−5 | −1.4120157E−5 | −5.8446589E−5 |

TABLE 9

| Coefficients of the Phase Difference Function | Surface #1 |
|---|---|
| $W_1$ | 2.0145109 |
| $W_2$ | −1.1106964E+1 |
| $W_3$ | −4.2062024E−1 |
| $W_4$ | −2.2264916E−1 |
| $W_5$ | 2.4517634E−2 |

FIG. 9A shows that a substantially collimated laser beam having a wavelength of 657 nm ($\lambda_2$) enters the objective lens 8 and the incident laser beam is converged by the objective lens 8 onto the recording area 10a of the DVD 9a under no substantial influence of the zonal part 14. FIG. 9B shows that a substantially collimated laser beam having a wavelength of 790 nm ($\lambda_1$) enters the objective lens 8 and the incident laser beam is converged by the objective lens 8 onto the recording area 10b of the CD-R 9b with a smaller numerical aperture after the light flux at the periphery is eliminated due to an interference effect from the zonal part 14.

FIGS. 10A and 10B illustrate intensity profiles of the light after being imaged to a spot by the optical recording media objective lens according to Embodiment 3 of the present invention, with FIG. 10A being the light intensity profile of the spot used for DVD recording/reproducing and FIG. 10B being the light intensity profile of the spot used for CD-R recording/reproducing. As is apparent from FIGS. 10A and 10B, the objective lens 8 of this embodiment yields accurately focused beam spots having the required numerical apertures.

FIGS. 11A and 11B show wavefront aberrations of the light beams collected by the objective lens 8 of this embodiment, with FIG. 11A being for the incident illumination as shown in FIG. 9A and FIG. 11B being for the incident illumination as shown in FIG. 9B. As is apparent from FIGS.

11A and 11B, the objective lens 8 causes a certain phase difference due to the zonal part 14 of the lens surface for both the DVD (FIG. 11A) and the CD-R (FIG. 11B).

In this embodiment, the zonal part 14 ($1.643 \leq Y < 1.892$) is recessed on the light source side and satisfies Conditions (5) and (6). The aperture diameter of the smaller numerical aperture, the aperture diameter of the larger numerical aperture, the inner stepped part position, the outer stepped part position, and the values of Conditions (5) and (6) for this embodiment are given in Table 33B.

EMBODIMENT 4

TABLE 10

| # | Surface Type or Radius of Curvature | Surface Spacing | | Refractive Index | |
|---|---|---|---|---|---|
| | | $\lambda = 657$ nm | $\lambda = 790$ nm | $\lambda = 657$ nm | $\lambda = 790$ nm |
| 1 | diffractive, aspherical | 2.220 | 2.220 | 1.50566 | 1.50222 |
| 2 | aspherical | 1.720 | 1.355 | 1.00000 | 1.00000 |
| 3 | ∞ | 0.600 | 1.200 | 1.58000 | 1.57000 |
| 4 | ∞ | | | | |

| | $\lambda = 657$ nm | $\lambda = 790$ nm |
|---|---|---|
| Diaphragm diameter, Φ | 4.00 | 4.00 |
| Focal length | 3.33 | 3.35 |
| Numercal Aperture, NA | 0.60 | 0.45 |
| Light source position | ∞ | ∞ |

TABLE 11

Coefficients of the Aspherical Equation

| | Surface #1 ($Y < 1.643$, $Y \geq 1.892$) | Surface #1 ($1.643 \leq Y < 1.892$) | Surface #2 |
|---|---|---|---|
| C | 4.9559546E−1 | 4.9559546E−1 | −1.5789498E−1 |
| K | 0.0 | 0.0 | 0.0 |
| B | 0.0 | −4.4825574E−3 | 0.0 |
| $A_2$ | 5.0656784E−3 | 5.0656784E−3 | 1.9387161E−2 |
| $A_3$ | 1.5769304E−4 | 1.5769304E−4 | −5.5082993E−3 |
| $A_4$ | −2.0984238E−5 | −2.0984238E−5 | 8.4309654E−4 |
| $A_5$ | −1.4120157E−5 | −1.4120157E−5 | −5.8446589E−5 |

TABLE 12

Coefficients of the Phase Difference Function

| | Surface #1 |
|---|---|
| $W_1$ | 2.0145109 |
| $W_2$ | −1.1106964E+1 |
| $W_3$ | −4.2062024E−1 |
| $W_4$ | −2.2264916E−1 |
| $W_5$ | 2.4517634E−2 |

Figure 12A:
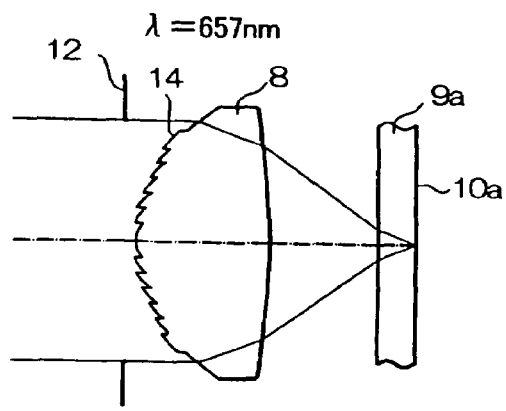
FIGS. 12A and 12B illustrate ray paths for the optical recording media objective lens according to Embodiment 4 of the present invention, with FIG. 12A showing the operation of the objective lens during DVD recording/reproducing and FIG. 12B showing the operation of the objective lens during CD-R recording/reproducing.
Figure 12B:
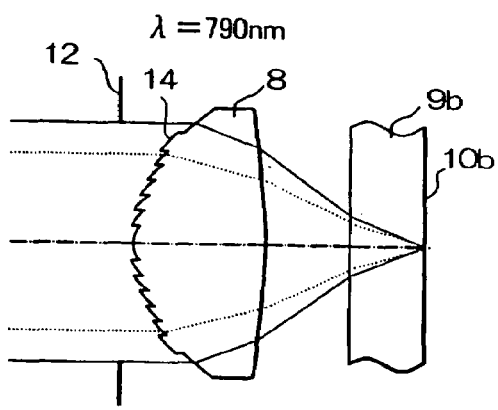

FIG. 12A shows that a substantially collimated laser beam having a wavelength of 657 nm ($\lambda_2$) enters the objective lens 8 and the incident laser beam is converged by the objective lens 8 onto the recording area 10a of the DVD 9a under no substantial influence of the zonal part 14. FIG. 12B shows that a substantially collimated laser beam having a wavelength of 790 nm ($\lambda_1$) enters the objective lens 8 and the incident laser beam is converged by the objective lens 8 onto the recording area 10b of the CD-R 9b with a smaller numerical aperture after the light flux at the periphery is eliminated due to an interference effect from the zonal part 14.

Figure 13A:
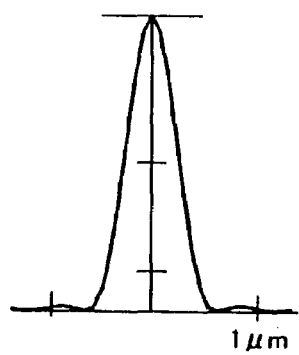
FIGS. 13A and 13B illustrate intensity profiles of the light after being imaged to a spot by the optical recording media objective lens according to Embodiment 4 of the present invention, with FIG. 14A being the light intensity profile of the spot used for DVD recording/reproducing and FIG. 14B being the light intensity profile of the spot used for CD-R recording/reproducing.
Figure 13B:
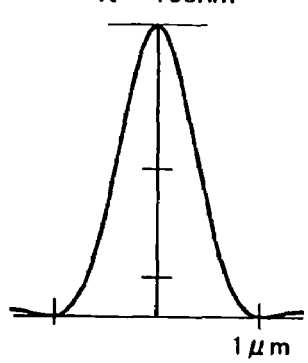

FIGS. 13A and 13B illustrate intensity profiles of the light after being imaged to a spot by the optical recording media objective lens according to Embodiment 4 of the present invention, with FIG. 13A being the light intensity profile of the spot used for DVD recording/reproducing and FIG. 13B being the light intensity profile of the spot used for CD-R recording/reproducing. As is apparent from FIGS. 13A and 13B, the objective lens 8 of this embodiment yields accurately focused beam spots having the required numerical apertures.

Figure 14A:
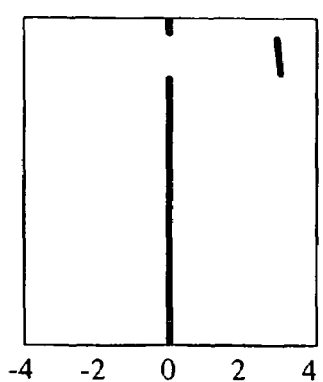
FIGS. 14A and 14B illustrate the wavefront aberrations of the light collected by the optical recording media objective lens of Embodiment 4 of the present invention, with FIG. 14A being the wavefront aberration for DVD recording/reproducing and with FIG. 14B being the wavefront aberration for CD-R recording/reproducing.
Figure 14B:
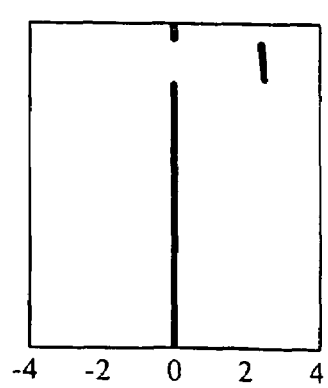

FIGS. 14A and 14B show wavefront aberrations of the light beams collected by the objective lens 8 of this embodiment, with FIG. 14A being for the incident illumination as shown in FIG. 12A and FIG. 14B being for the incident illumination as shown in FIG. 12B. As is apparent from FIGS. 14A and 14B, the objective lens 8 causes a certain phase difference due to the zonal part 14 of the lens surface for both the DVD (FIG. 14A) and the CD-R (FIG. 14B).

In this embodiment, the zonal part 14 ($1.643 \leq Y < 1.892$) protrudes on the light source side and satisfies Conditions (5) and (6). The aperture diameter of the smaller numerical aperture, the aperture diameter of the larger numerical aperture, the inner stepped part position, the outer stepped part position, and values of Conditions (5) and (6) for this embodiment are given in Table 33B.

EMBODIMENT 5

TABLE 13

| # | Surface Type or Radius of Curvature | Surface Spacing | | Refractive Index | |
|---|---|---|---|---|---|
| | | $\lambda = 657$ nm | $\lambda = 790$ nm | $\lambda = 657$ nm | $\lambda = 790$ nm |
| 1 | diffractive, aspherical | 2.220 | 2.220 | 1.50566 | 1.50222 |
| 2 | aspherical | 1.720 | 1.355 | 1.00000 | 1.00000 |

TABLE 13-continued

| | | | | |
|---|---|---|---|---|
| 3 ∞ | 0.600 | 1.200 | 1.58000 | 1.57000 |
| 4 ∞ | | | | |

| | $\lambda$ = 657 nm | $\lambda$ = 790 nm |
|---|---|---|
| Diaphragm diameter, Φ | 4.00 | 4.00 |
| Focal length | 3.33 | 3.35 |
| Numercal Aperture, NA | 0.60 | 0.50 |
| Light source position | ∞ | ∞ |

TABLE 14

Coefficients of the Aspherical Equation

| | Surface #1 (Y < 1.767, Y ≧ 1.922) | Surface #1 (1.767 ≦ Y < 1.922) | Surface #2 |
|---|---|---|---|
| C | 4.9559546E−1 | 4.9559546E−1 | −1.5789498E−1 |
| K | 0.0 | 0.0 | 0.0 |
| B | 0.0 | 4.5926686E−3 | 0.0 |
| $A_2$ | 5.0656784E−3 | 5.0656784E−3 | 1.9387161E−2 |
| $A_3$ | 1.5769304E−4 | 1.5769304E−4 | −5.5082993E−3 |
| $A_4$ | −2.0984238E−5 | −2.0984238E−5 | 8.4309654E−4 |
| $A_5$ | −1.4120157E−5 | −1.4120157E−5 | −5.8446589E−5 |

TABLE 15

| Coefficients of the Phase Difference Function | Surface #1 |
|---|---|
| $W_1$ | 2.0145109 |
| $W_2$ | −1.1106964E+1 |
| $W_3$ | −4.2062024E−1 |
| $W_4$ | −2.2264916E−1 |
| $W_5$ | 2.4517634E−2 |

Figure 15A:
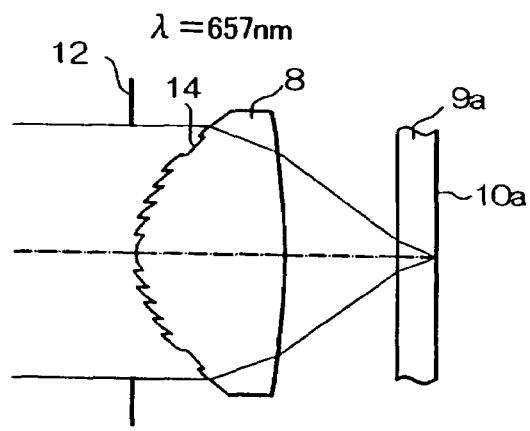
FIGS. 15A and 15B illustrate ray paths for the optical recording media objective lens according to Embodiment 5 of the present invention, with FIG. 15A showing the operation of the objective lens during DVD recording/reproducing and FIG. 15B showing the operation of the objective lens during CD-R recording/reproducing.
Figure 15B:
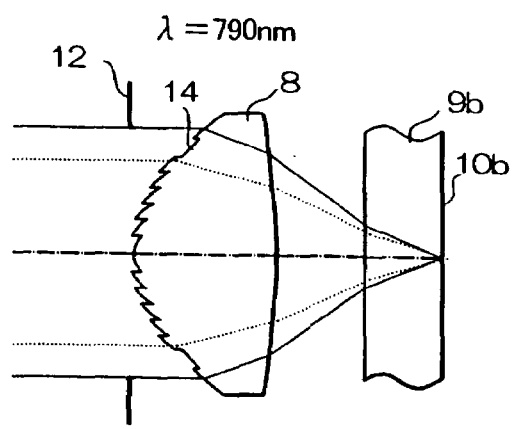

FIG. 15A shows that a substantially collimated laser beam having a wavelength of 657 nm ($\lambda_2$) enters the objective lens 8 and the incident laser beam is converged by the objective lens 8 onto the recording area 10a of the DVD 9a under no substantial influence of the zonal parts 14. FIG. 15B shows that a substantially collimated laser beam having a wavelength of 790 nm ($\lambda_1$) enters the objective lens 8 and the incident laser beam is converged by the objective lens 8 onto the recording area 10b of the CD-R 9b with a smaller numerical aperture after the light flux at the periphery is eliminated due to an interference effect from the zonal parts 14.

Figure 16A:
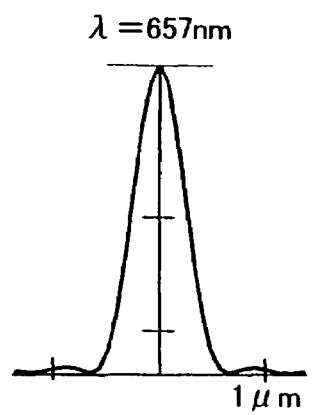
FIGS. 16A and 16B illustrate intensity profiles of the light after being imaged to a spot by the optical recording media objective lens according to Embodiment 5 of the present invention, with FIG. 16A being the light intensity profile of the spot used for DVD recording/reproducing and FIG. 16B being the light intensity profile of the spot used for CD-R recording/reproducing.
Figure 16B:
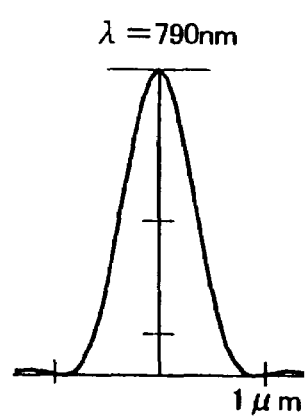

FIGS. 16A and 16B illustrate intensity profiles of the light after being imaged to a spot by the optical recording media objective lens according to Embodiment 5 of the present invention, with FIG. 16A being the light intensity profile of the spot used for DVD recording/reproducing and FIG. 16B being the light intensity profile of tile spot used for CD-R recording/reproducing. As is apparent from FIGS. 16A and 16B, the objective lens 8 of this embodiment yields accurately focused beam spots having the required numerical apertures.

Figure 17A:
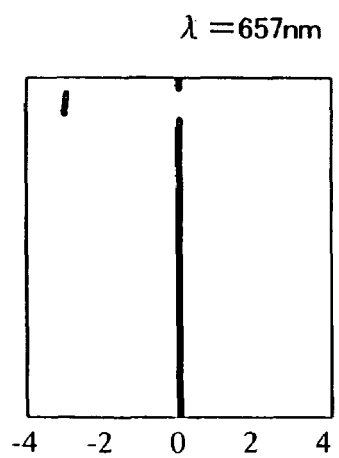
FIGS. 17A and 17B illustrate the wavefront aberrations of the light collected by the optical recording media objective lens of Embodiment 5 of the present invention, with FIG. 17A being the wavefront aberration for DVD recording/reproducing and with FIG. 17B being the wavefront aberration for CD-R recording/reproducing.
Figure 17B:
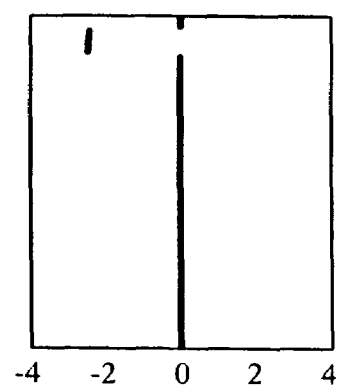

FIGS. 17A and 17B show wavefront aberrations of tile light beams collected by the objective lens 8 of this embodiment, with FIG. 17A being for the incident illumination as shown in FIG. 15A and FIG. 17B being for the incident illumination as shown in FIG. 15B. As is apparent from FIGS. 17A and 17B, the objective lens 8 causes a certain phase difference due to the zonal part 14 of the lens surface for both the DVD (FIG. 17A) and the CD-R (FIG. 17B).

In this embodiment, tile zonal part 14 (1.767≦Y<1.922) is recessed on the light source side and satisfies the Conditions (5) and (6). The aperture diameter of the smaller numerical aperture, the aperture diameter of the larger numerical aperture, the inner stepped part position, the outer stepped part position, and the values of Conditions (5) and (6) for this embodiment are given in Table 33B.

EMBODIMENT 6

TABLE 16

| | Surface Type or Radius of Curvature | Surface Spacing | | Refractive Index | |
|---|---|---|---|---|---|
| # | | $\lambda$ = 657 nm | $\lambda$ = 790 nm | $\lambda$ = 657 nm | $\lambda$ = 790 nm |
| 1 | diffractive, aspherical | 2.220 | 2.220 | 1.50566 | 1.50222 |
| 2 | aspherical | 1.720 | 1.355 | 1.00000 | 1.00000 |
| 3 | ∞ | 0.600 | 1.200 | 1.58000 | 1.57000 |
| 4 | ∞ | | | | |

| | $\lambda$ = 657 nm | $\lambda$ = 790 nm |
|---|---|---|
| Diaphragm diameter, Φ | 4.00 | 4.00 |
| Focal length | 3.33 | 3.35 |
| Numercal Aperture, NA | 0.60 | 0.50 |
| Light source position | ∞ | ∞ |

TABLE 17

Coefficients of the Aspherical Equation

| | Surface #1 (Y < 1.767, Y ≧ 1.922) | Surface #1 (1.767 ≦ Y < 1.922) | Surface #2 |
|---|---|---|---|
| C | 4.9559546E-1 | 4.9559546E-1 | -1.5789498E-1 |
| K | 0.0 | 0.0 | 0.0 |
| B | 0.0 | -4.5926686E-3 | 0.0 |
| $A_2$ | 5.0656784E-3 | 5.0656784E-3 | 1.9387161E-2 |
| $A_3$ | 1.5769304E-4 | 1.5769304E-4 | -5.5082993E-3 |
| $A_4$ | -2.0984238E-5 | -2.0984238E-5 | 8.4309654E-4 |
| $A_5$ | -1.4120157E-5 | -1.4120157E-5 | -5.8446589E-5 |

TABLE 18

| Coefficients of the Phase Difference Function | Surface #1 |
|---|---|
| $W_1$ | 2.0145109 |
| $W_2$ | -1.1106964E+1 |
| $W_3$ | -4.2062024E-1 |
| $W_4$ | -2.2264916E-1 |
| $W_5$ | 2.4517634E-2 |

Figure 18A:
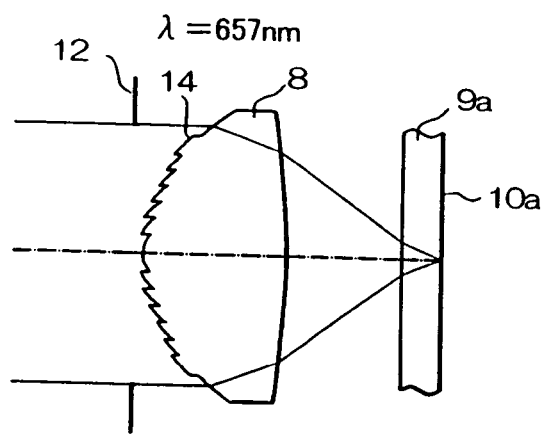
FIGS. 18A and 18B illustrate ray paths for the optical recording media objective lens according to Embodiment 6 of the present invention, with FIG. 18A showing the operation of the objective lens during DVD recording/reproducing and FIG. 18B showing the operation of the objective lens during CD-R recording/reproducing.
Figure 18B:
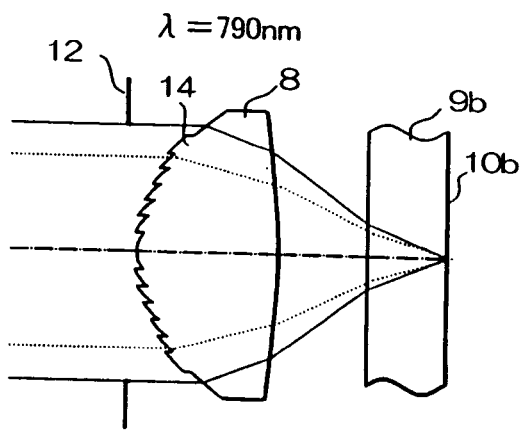

FIG. 18A shows that a substantially collimated laser beam having a wavelength of 657 nm ($\lambda_2$) enters the objective lens 8 and the incident laser beam is converged by the objective lens 8 onto the recording area 10a of the DVD 9a under no substantial influence of the zonal part 14. FIG. 18B shows that a substantially collimated laser beam having a wavelength of 790 nm ($\lambda_1$) enters the objective lens 8 and the incident laser beam is converged by the objective lens 8 onto the recording area 10b of the CD-R 9b with a smaller numerical aperture after the light flux at the periphery is eliminated due to an interference effect from the zonal parts 14.

Figure 19A:
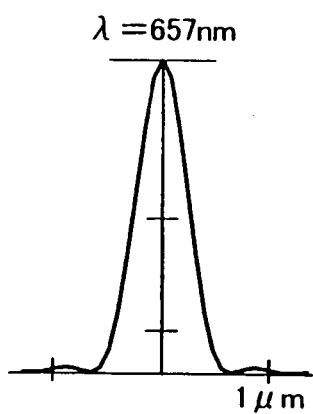
FIGS. 19A and 19B illustrate intensity profiles of the light after being imaged to a spot by tile optical recording media objective lens according to Embodiment 6 of the present invention, with FIG. 19A being the light intensity profile of the spot used for DVD recording/reproducing and FIG. 19B being the light intensity profile of the spot used for CD-R recording/reproducing.
Figure 19B:
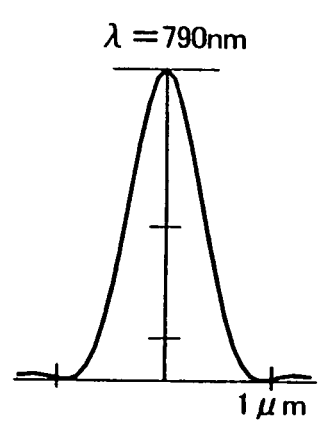

FIGS. 19A and 19B illustrate intensity profiles of the light after being imaged to a spot by the optical recording media objective lens according to Embodiment 6 of the present invention, with FIG. 19A being the light intensity profile of the spot used for DVD recording/reproducing and FIG. 19B being the light intensity profile of the spot used for CD-R recording/reproducing. As is apparent from FIGS. 19A and 19B, the objective lens 8 of this embodiment yields accurately Focused beam spots having the required numerical apertures.

Figure 20A:
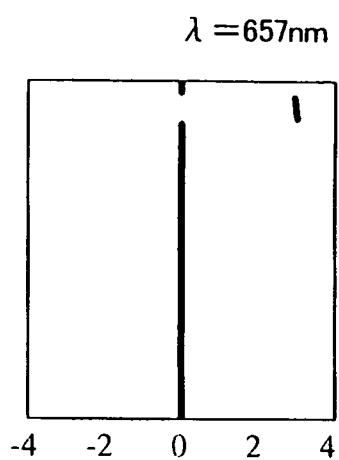
FIGS. 20A and 20B illustrate the wavefront aberrations of the light collected by the optical recording media objective lens of Embodiment 6 of the present invention, with FIG. 20A being the wavefront aberration for DVD recording/reproducing and with FIG. 20B being the wavefront aberration for CD-R recording/reproducing.
Figure 20B:
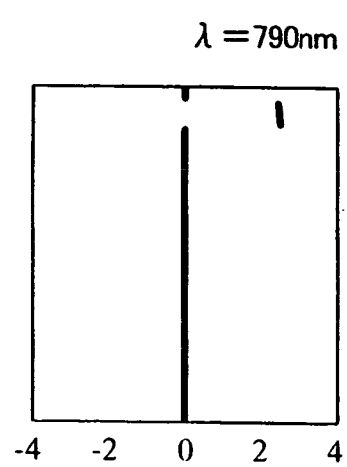

FIGS. 20A and 20B show wavefront aberrations of the light beams collected by the objective lens 8 of this embodiment, with FIG. 20A being for the incident illumination as shown in FIG. 18A and FIG. 20B being for the incident illumination as shown in FIG. 18B. As is apparent from FIGS. 20A and 20B, the objective lens 8 causes a certain phase difference due to the zonal part 14 of the lens surface for both the DVD (FIG. 20A) and the CD-R (FIG. 20B).

In this embodiment, the zonal part 14 (1.767≦Y<1.922) is recessed on the light source side and satisfies the Conditions (5) and (6). The aperture diameter of the smaller numerical aperture, the aperture diameter of the larger numerical aperture, the inner stepped part position, the outer stepped part position, and the values of Conditions (5) and (6) for this embodiment are given in Table 33B.

EMBODIMENT 7

TABLE 19

| | | Surface Spacing | | Refractive Index | |
|---|---|---|---|---|---|
| # | Surface Type or Radius of Curvature | $\lambda$ = 657 nm | $\lambda$ = 790 nm | $\lambda$ = 657 nm | $\lambda$ = 790 nm |
| 1 | diffractive, aspherical | 2.220 | 2.220 | 1.50566 | 1.50222 |
| 2 | aspherical | 1.720 | 1.355 | 1.00000 | 1.00000 |
| 3 | ∞ | 0.600 | 1.200 | 1.58000 | 1.57000 |
| 4 | ∞ | | | | |

| | $\lambda$ = 657 nm | $\lambda$ = 790 nm |
|---|---|---|
| Diaphragm diameter, Φ | 4.00 | 4.00 |
| Focal length | 3.33 | 3.35 |
| Numercal Aperture, NA | 0.60 | 0.50 |
| Light source position | ∞ | ∞ |

TABLE 20

Coefficients of the Aspherical Equation

| | Surface #1 (Y < 1.752, Y ≧ 1.912) | Surface #1 (1.752 ≦ Y < 1.912) | Surface #2 |
|---|---|---|---|
| C | 4.9559546E-1 | 4.9559546E-1 | -1.5789498E-1 |
| K | 0.0 | 0.0 | 0.0 |

TABLE 20-continued

Coefficients of the Aspherical Equation

| | Surface #1 (Y < 1.752, Y ≧ 1.912) | Surface #1 (1.752 ≦ Y < 1.912) | Surface #2 |
|---|---|---|---|
| B | 0.0 | 4.6083987E−3 | 0.0 |
| $A_2$ | 5.0656784E−3 | 5.0656784E−3 | 1.9387161E−2 |
| $A_3$ | 1.5769304E−4 | 1.5769304E−4 | −5.5082993E−3 |
| $A_4$ | −2.0984238E−5 | −2.0984238E−5 | 8.4309654E−4 |
| $A_5$ | −1.4120157E−5 | −1.4120157E−5 | −5.8446589E−5 |

TABLE 21

| Coefficients of the Phase Difference Function | Surface #1 |
|---|---|
| $W_1$ | 2.0145109 |
| $W_2$ | −1.1106964E+1 |
| $W_3$ | −4.2062024E−1 |
| $W_4$ | −2.2264916E−1 |
| $W_5$ | 2.4517634E−2 |

Figure 21A:
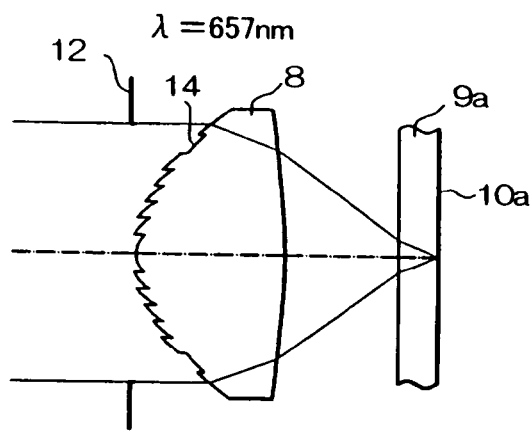
FIGS. 21A and 21B illustrate ray paths for the optical recording media objective lens according to Embodiment 7 of the present invention, with FIG. 21A showing the operation of the objective lens during DVD recording/reproducing and FIG. 21B showing the operation of the objective lens during CD-R recording/reproducing.
Figure 21B:
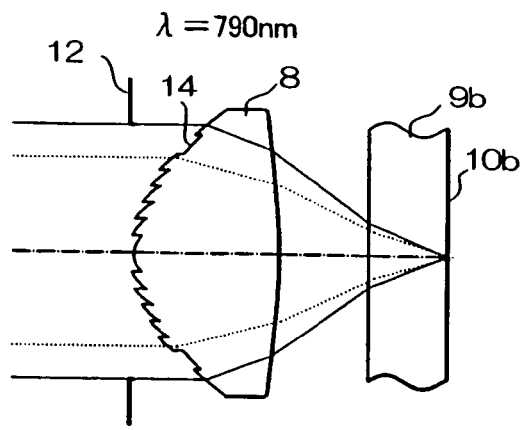

FIG. 21A shows that a substantially collimated laser beam having a wavelength of 657 nm ($\lambda_2$) enters the objective lens 8 and the incident laser beam is converged by the objective lens 8 onto the recording area 10a of the DVD 9a under no substantial influence of the zonal part 14. FIG. 21B shows that a substantially collimated laser beam having a wavelength of 790 nm ($\lambda_1$) enters the objective lens 8 and the incident laser beam is converged by the objective lens 8 onto the recording area 10b of the CD-R 9b with a smaller numerical aperture after the light flux at the periphery is eliminated due to an interference effect from the zonal parts 14.

Figure 22A:
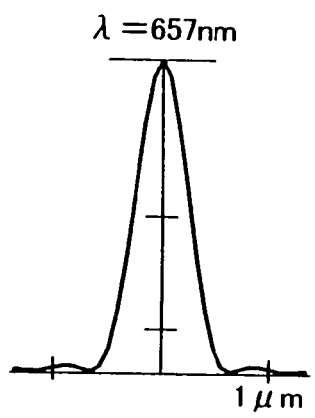
FIGS. 22A and 22B illustrate intensity profiles of the light after being imaged to a spot by the optical recording media objective lens according to Embodiment 7 of the present invention, with FIG. 22A being the light intensity profile of the spot used for DVD recording/reproducing and FIG. 22B being the light intensity profile of the spot used for CD-R recording/reproducing.
Figure 22B:
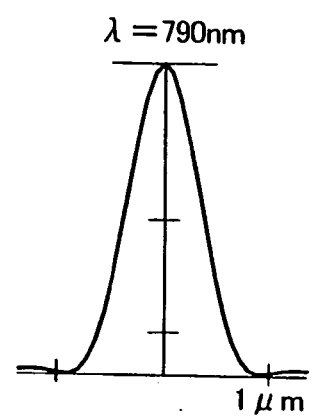

FIGS. 22A and 22B illustrate intensity profiles of the light after being imaged to a spot by the optical recording media objective lens according to Embodiment 7 of the present invention, with FIG. 22A being the light intensity profile of the spot used for DVD recording/reproducing and FIG. 22B being the light intensity profile of the spot used for CD-R recording/reproducing. As is apparent from FIGS. 22A and 22B, the objective lens 8 of this embodiment yields accurately focused beam spots having the required numerical apertures.

Figure 23A:
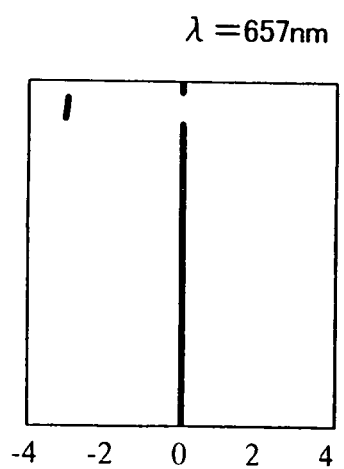
FIGS. 23A and 23B illustrate the wavefront aberrations of the light collected by the optical recording media objective lens of Embodiment 7 of the present invention, with FIG. 23A being the wavefront aberration for DVD recording/reproducing and with FIG. 23B being the wavefront aberration for CD-R recording/reproducing.
Figure 23B:
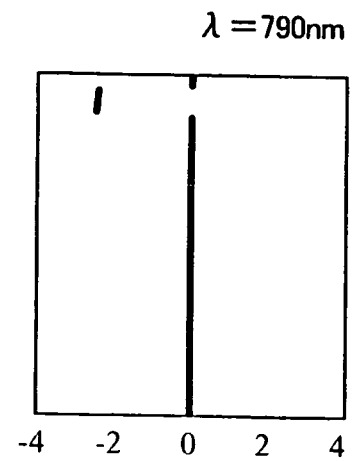

FIGS. 23A and 23B show wavefront aberrations of the light beams collected by the objective lens 8 of this embodiment, with FIG. 23A being for the incident illumination as shown in FIG. 21A and FIG. 23B being for the incident illumination as shown in FIG. 21B. As is apparent from FIGS. 23A and 23B, the objective lens 8 causes a certain phase difference due to the zonal part 14 of the lens Surface for both the DVD (FIG. 23A) and the CD-R (FIG. 23B).

In this embodiment, the zonal part 14 (1.752≦Y<1.912) is recessed on the light source side and satisfies the Conditions (3) and (4). The aperture diameter of the smaller numerical aperture, the aperture diameter of the larger numerical aperture, the inner stepped part position, the outer stepped part position, and the values of the Conditions (3) and (4) of this embodiment are given in Table 33.

EMBODIMENT 8

TABLE 22

| | Surface Type or Radius of Curvature | Surface Spacing | | Refractive Index | |
|---|---|---|---|---|---|
| # | | λ = 657 nm | λ = 790 nm | λ = 657 nm | λ = 790 nm |
| 1 | diffractive, aspherical | 2.220 | 2.220 | 1.50566 | 1.50222 |
| 2 | aspherical | 1.720 | 1.355 | 1.00000 | 1.00000 |
| 3 | ∞ | 0.600 | 1.200 | 1.58000 | 1.57000 |
| 4 | ∞ | | | | |

| | λ = 657 nm | λ = 790 nm |
|---|---|---|
| Diaphragm diameter, Φ | 4.00 | 4.00 |
| Focal length | 3.33 | 3.35 |
| Numercal Aperture, NA | 0.60 | 0.50 |
| Light source position | ∞ | ∞ |

TABLE 23

Coefficients of the Aspherical Equation

| | Surface #1 (Y < 1.752, Y≧ 1.912) | Surface #1 (1.752 ≦ Y < 1.912) | Surface #2 |
|---|---|---|---|
| C | 4.9559546E−1 | 4.9559546E−1 | −1.5789498E−1 |
| K | 0.0 | 0.0 | 0.0 |
| B | 0.0 | −4.6083987E−3 | 0.0 |
| $A_2$ | 5.0656784E−3 | 5.0656784E−3 | 1.9387161E−2 |

TABLE 23-continued

Coefficients of the Aspherical Equation

| | Surface #1 (Y < 1.752, Y≧ 1.912) | Surface #1 (1.752 ≦ Y < 1.912) | Surface #2 |
|---|---|---|---|
| $A_3$ | 1.5769304E−4 | 1.5769304E−4 | −5.5082993E−3 |
| $A_4$ | −2.0984238E−5 | −2.0984238E−5 | 8.4309654E−4 |
| $A_5$ | −1.4120157E−5 | −1.4120157E−5 | −5.8446589E−5 |

TABLE 24

| Coefficients of the Phase Difference Function | Surface #1 |
|---|---|
| $W_1$ | 2.0145109 |
| $W_2$ | −1.1106964E+1 |
| $W_3$ | −4.2062024E−1 |
| $W_4$ | −2.2264916E−1 |
| $W_5$ | 2.4517634E−2 |

Figure 24A:
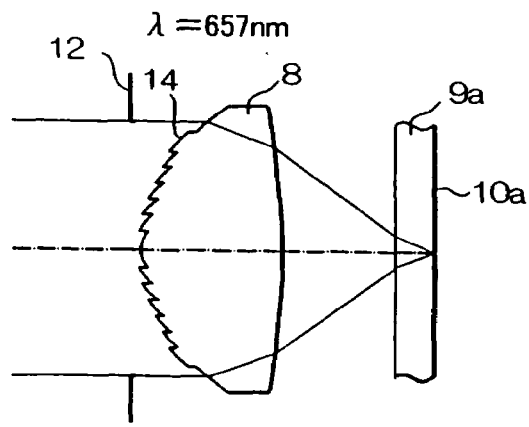
FIGS. 24A and 24B illustrate ray paths for the optical recording media objective lens according to Embodiment 8 of the present invention, with FIG. 24A showing the operation of the objective lens during DVD recording/reproducing and FIG. 24B showing the operation of the objective lens during CD-R recording/reproducing.
Figure 24B:
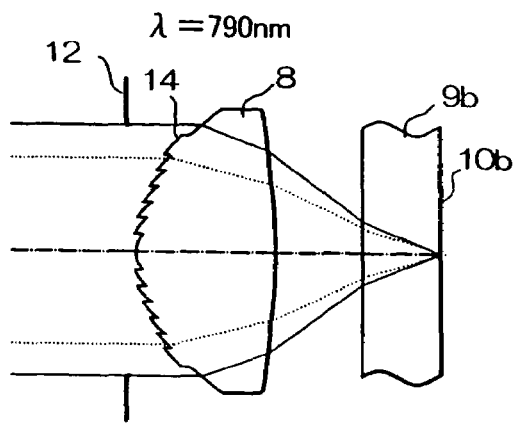

FIG. 24A shows that a substantially collimated laser beam having a wavelength of 657 nm ($\lambda_2$) enters the objective lens 8 and the incident laser beam is converged by the objective lens 8 onto the recording area 10a of the DVD 9a under no substantial influence of the zonal parts 14. FIG. 24B shows that a substantially collimated laser beam having a wavelength of 790 nm ($\lambda_1$) enters the objective lens 8 and the incident laser beam is converged by the objective lens 8 onto the recording area 10b of the CD-R 9b with a smaller numerical aperture after the light flux at the periphery is eliminated due to an interference effect from the zonal parts 14.

Figure 25A:
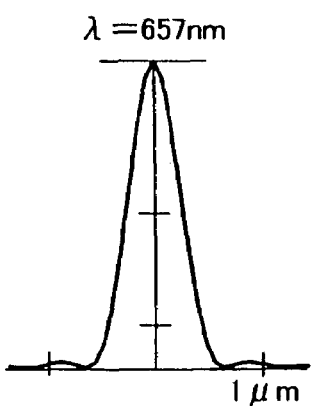
FIGS. 25A and 25B illustrate intensity profiles of the light after being imaged to a spot by the optical recording media objective lens according to Embodiment 8 of the present invention, with FIG. 25A being the light intensity profile of the spot used for DVD recording/reproducing and FIG. 25B being the light intensity profile of the spot used for CD-R recording/reproducing.
Figure 25B:
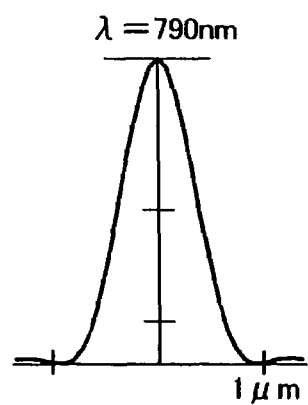

FIGS. 25A and 25B illustrate intensity profiles of the light after being imaged to a spot by the optical recording media objective lens according to Embodiment 8 of the present invention, with FIG. 25A being the light intensity profile of the spot used for DVD recording/reproducing and FIG. 25B being the light intensity profile of the spot used for CD-R recording/reproducing. As is apparent from FIGS. 25A and 25B, the objective lens 8 of this embodiment yields accurately focused beam spots having the required numerical apertures.

Figure 26A:
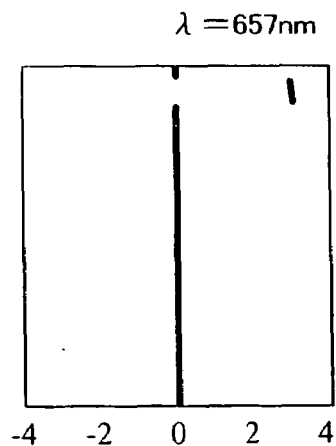
FIGS. 26A and 26B illustrate the wavefront aberrations of the light collected by the optical recording media objective lens of Embodiment 8 of the present invention, with FIG. 26A being the wavefront aberration for DVD recording/reproducing and with FIG. 26B being the wavefront aberration for CD-R recording/reproducing.
Figure 26B:
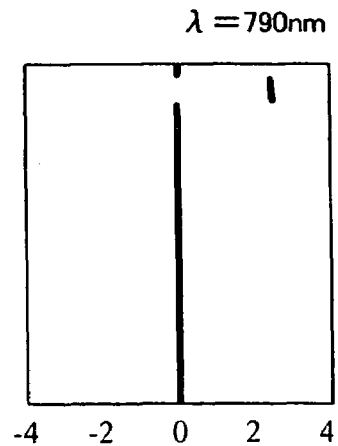

FIGS. 26A and 26B show wavefront aberrations of the light beams collected by the objective lens 8 of this embodiment, with FIG. 26A being for the incident illumination as shown in FIG. 24A and FIG. 26B being for the incident illumination as shown in FIG. 24B. As is apparent from FIGS. 26A and 26B, the objective lens 8 causes a certain phase difference due to the zonal part 14 of the lens surface for both the DVD (FIG. 26A) and the CD-R (FIG. 26B).

In this embodiment, the zonal part 14 (1.752≦Y<1.912) protrudes on the light source side and satisfies the Conditions (3) and (4). The aperture diameter of the smaller numerical aperture, the aperture diameter of the larger numerical aperture, the inner stepped part position, the outer stepped part position, and the values of the Conditions (3) and (4) of this Embodiment are given in Table 33.

EMBODIMENT 9

As mentioned previously, starting with this embodiment, the optical diffraction surface having a phase difference function is omitted, but the zonal part 14 is retained.

TABLE 25

| # | Surface Type or Radius of Curvature | Surface Spacing | | Refractive Index | |
|---|---|---|---|---|---|
| | | $\lambda$ = 650 nm | $\lambda$ = 780 nm | $\lambda$ = 650 nm | $\lambda$ = 780 nm |
| (diaphragm) | ∞ | −0.900 | −0.900 | 1.00000 | 1.00000 |
| 1 | aspherical | 2.150 | 2.150 | 1.52270 | 1.51921 |
| 2 | aspherical | 1.486 | 1.314 | 1.00000 | 1.00000 |
| 3 | ∞ | 0.600 | 1.200 | 1.58000 | 1.57000 |
| 4 | ∞ | | | | |

| | $\lambda$ = 650 nm | $\lambda$ = 780 nm |
|---|---|---|
| Diaphragm diameter, Φ | 3.66 | 3.66 |
| Focal length | 3.05 | 3.07 |
| Numercal Aperture, NA | 0.60 | 0.45 |
| Light source position | ∞ | −50.72 |

(distance from the surface #1)

TABLE 26

Coefficients of the Aspherical Equation

| | Surface #1 (Y < 1.554, Y ≧ 1.743) | Surface #1 (1.554 ≦ Y < 1.743) | Surface #2 |
|---|---|---|---|
| C | 5.2611873E−1 | 5.2611873E−1 | −1.6534302E−1 |
| K | 0.0 | 0.0 | 0.0 |
| B | 0.0 | 4.3044002E−3 | 0.0 |
| $A_2$ | 8.8231287E−3 | 8.8231287E−3 | 2.4041080E−2 |
| $A_3$ | 5.1373004E−4 | 5.1373004E−4 | −6.6679891E−3 |
| $A_4$ | 9.1493318E−5 | 9.1493318E−5 | 1.0301671E−3 |
| $A_5$ | −2.1808003E−5 | −2.1808003E−5 | −6.5291235E−5 |

Figure 27A:
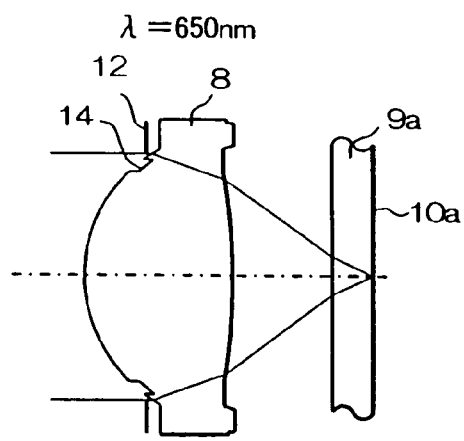
FIGS. 27A and 27B illustrate ray paths for the optical recording media objective lens according to Embodiment 9 of the present invention, with FIG. 27A showing the operation of the objective lens during DVD recording/reproducing and FIG. 27B showing the operation of the objective lens during CD-R recording/reproducing.
Figure 27B:
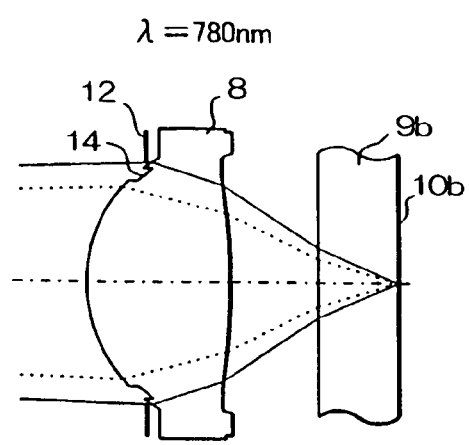

FIG. 27A shows that, when a substantially collimated laser beam having a wavelength of 650 nm ($\lambda_2$) enters the objective lens 8, the incident laser beam is converged by the objective lens 8 onto the recording area 10*a* of the DVD 9*a* under no substantial influence of the zonal parts 14. FIG. 27B shows that, when a slightly diverging laser beam having a wavelength of 780 nm ($\lambda_1$) enters the objective lens 8, the incident laser beam is converged by the objective lens 8 onto the recording area 10*b* of the CD-R 9*b* with a smaller numerical aperture after the light flux at the periphery is eliminated due to an interference effect of the zonal parts 14.

Figure 28A:
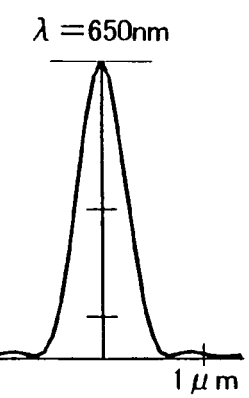
FIGS. 28A and 28B illustrate intensity profiles of the light after being imaged to a spot by the optical recording media objective lens according to Embodiment 9 of the present invention, with FIG. 28A being the light intensity profile of the spot used for DVD recording/reproducing and FIG. 28B being the light intensity profile of the spot used for CD-R recording/reproducing.
Figure 28B:
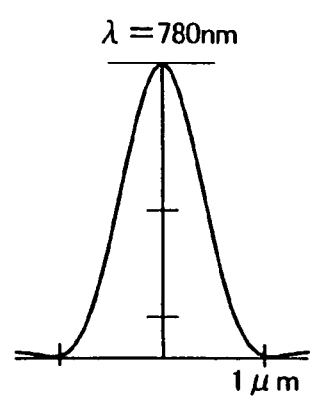

FIGS. 28A and 28B illustrate intensity profiles of the light after being imaged to a spot by the optical recording media objective lens according to Embodiment 9 of the present invention, with FIG. 28A being the light intensity profile of the spot used for DVD recording/reproducing and FIG. 28B being the light intensity profile of the spot used for CD-R recording/reproducing. As is apparent from FIGS. 28A and 28B, the objective lens 8 of this embodiment yields accurately focused beam spots having the required numerical apertures.

Figure 29A:
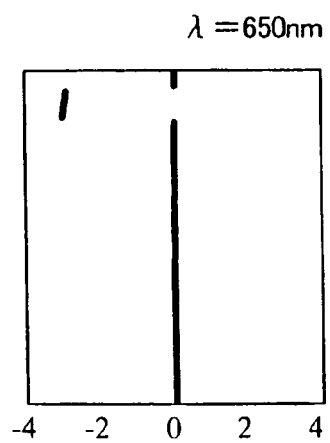
FIGS. 29A and 29B illustrate the wavefront aberrations of the light collected by the optical recording media objective lens of Embodiment 9 of the present invention, with FIG. 29A being the wavefront aberration for DVD recording/reproducing and with FIG. 29B being the wavefront aberration for CD-R recording/reproducing.
Figure 29B:
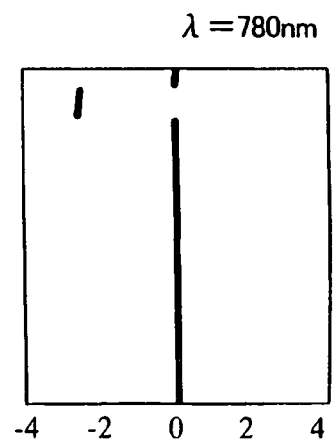

FIGS. 29A and 29B show wavefront aberrations of the light beams collected by the objective lens 8 of this embodiment, with FIG. 29A being for the incident illumination as shown in FIG. 27A and FIG. 29B being for the incident illumination as shown in FIG. 27B. As is apparent from FIGS. 29A and 29B, the objective lens 8 causes a certain phase difference due to the zonal part 14 of the lens surface for both the DVD (FIG. 29A) and the CD-R (FIG. 29B).

In this embodiment, the zonal part 14 (1.554≦Y<1.743) is recessed on the light source side and satisfies the Conditions (5) and (6). The aperture diameter of the smaller numerical aperture, the aperture diameter of the larger numerical aperture, the inner stepped part position, the outer stepped part position, and the values of the Conditions (5) and (6) of this embodiment are given in Table 33B.

EMBODIMENT 10

As mentioned previously, the optical diffraction surface having a phase difference function is omitted from this embodiment, but the zonal part 14 is retained.

TABLE 27

| # | Surface Type or Radius of Curvature | Surface Spacing | | Refractive Index | |
|---|---|---|---|---|---|
| | | $\lambda$ = 650 nm | $\lambda$ = 780 nm | $\lambda$ = 650 nm | $\lambda$ = 780 nm |
| (diaphragm) | ∞ | −0.900 | −0.900 | 1.00000 | 1.00000 |
| 1 | aspherical | 2.150 | 2.150 | 1.52270 | 1.51921 |
| 2 | aspherical | 1.486 | 1.314 | 1.00000 | 1.00000 |
| 3 | ∞ | 0.600 | 1.200 | 1.58000 | 1.57000 |
| 4 | ∞ | | | | |

| | $\lambda$ = 650 nm | $\lambda$ = 780 nm |
|---|---|---|
| Diaphragm diameter, Φ | 3.66 | 3.66 |
| Focal length | 3.05 | 3.07 |
| Numercal Aperture, NA | 0.60 | 0.45 |
| Light source position | ∞ | −50.72 |
| | | (distance from the surface #1) |

TABLE 28

Coefficients of the Aspherical Equation

| | Surface #1 (Y < 1.554, Y ≧ 1.743) | Surface #1 (1.554 ≦ Y < 1.743) | Surface #2 |
|---|---|---|---|
| C | 5.2611873E−1 | 5.2611873E−1 | −1.6534302E−1 |
| K | 0.0 | 0.0 | 0.0 |
| B | 0.0 | −4.3044002E−3 | 0.0 |
| $A_2$ | 8.8231287E−3 | 8.8231287E−3 | 2.4041080E−2 |
| $A_3$ | 5.1373004E−4 | 5.1373004E−4 | −6.6679891E−3 |
| $A_4$ | 9.1493318E−5 | 9.1493318E−5 | 1.0301671E−3 |
| $A_5$ | −2.1808003E−5 | −2.1808003E−5 | −6.5291235E−5 |

FIG. 30A shows that, when a substantially collimated laser beam having a wavelength of 650 nm ($\lambda_2$) enters the objective lens 8, the incident laser beam is converged by the objective lens 8 onto the recording area 10a of the DVD 9a under no substantial influence of the zonal parts 14. FIG. 30B shows that, when a slightly diverging laser beam having a wavelength of 780 nm ($\lambda_1$) enters the objective lens 8, the incident laser beam is converged by the objective lens 8 onto the recording area 10b of the CD-R 9b with a smaller numerical aperture after the light flux at the periphery is eliminated due to an interference effect of the zonal part 14.

FIGS. 31A and 31B illustrate intensity profiles of the light after being imaged to a spot by the optical recording media objective lens according to Embodiment 10 of the present invention, with FIG. 31A being the light intensity profile of the spot used for DVD recording/reproducing and FIG. 31B being the light intensity profile of the spot used for CD-R recording/reproducing. As is apparent from FIGS. 31A and 31B, the objective lens 8 of this embodiment yields accurately focused beam spots having the required numerical apertures.

FIGS. 32A and 32B show wavefront aberrations of the light beams collected by the objective lens 8 for this embodiment, with FIG. 32A being for the incident illumination as shown in FIG. 30A and FIG. 32B being for the incident illumination as shown in FIG. 30B. As is apparent from FIGS. 32A and 32B, the objective lens 8 causes a certain phase difference due to the zonal part 14 of the lens surface for both the DVD (FIG. 32A) and the CD-R (FIG. 32B).

In this embodiment, the zonal part 14 (1.554≦Y<1.743) protrudes on the light source side and satisfies the Conditions (5) and (6). The aperture diameter of the smaller numerical aperture, the aperture diameter of the larger numerical aperture, the inner stepped part position, the outer stepped part position, and the values of the Conditions (5) and (6) for this Embodiment are given in Table 33B.

EMBODIMENT 11

As mentioned previously, the optical diffraction surface having a phase difference function is omitted from this embodiment, but the zonal part 14 is retained.

TABLE 29

| # | Surface Type or Radius of Curvature | Surface Spacing $\lambda = 650$ nm | Surface Spacing $\lambda = 780$ nm | Refractive Index $\lambda = 650$ nm | Refractive Index $\lambda = 780$ nm |
|---|---|---|---|---|---|
| (diaphragm) | ∞ | −0.900 | −0.900 | 1.00000 | 1.00000 |
| 1 | aspherical | 2.150 | 2.150 | 1.52270 | 1.51921 |
| 2 | aspherical | 1.486 | 1.314 | 1.00000 | 1.00000 |
| 3 | ∞ | 0.600 | 1.200 | 1.58000 | 1.57000 |
| 4 | ∞ | | | | |

| | $\lambda = 650$ nm | $\lambda = 780$ nm |
|---|---|---|
| Diaphragm diameter, Φ | 3.66 | 3.66 |
| Focal length | 3.05 | 3.07 |
| Numercal Aperture, NA | 0.60 | 0.45 |
| Light source position | ∞ | −50.72 (distance from the surface #1) |

TABLE 30

Coefficients of the Aspherical Equation

| | Surface #1 (Y < 1.546, Y ≧ 1.735) | Surface #1 (1.546 ≦ Y < 1.735) | Surface #2 |
|---|---|---|---|
| C | 5.2611873E−1 | 5.2611873E−1 | −1.6534302E−1 |
| K | 0.0 | 0.0 | 0.0 |
| B | 0.0 | 4.3417065E−3 | 0.0 |
| $A_2$ | 8.8231287E−3 | 8.8231287E−3 | 2.4041080E−2 |
| $A_3$ | 5.1373004E−4 | 5.1373004E−4 | −6.6679891E−3 |
| $A_4$ | 9.1493318E−5 | 9.1493318E−5 | 1.0301671E−3 |
| $A_5$ | −2.1808003E−5 | −2.1808003E−5 | −6.5291235E−5 |

Figure 33A:
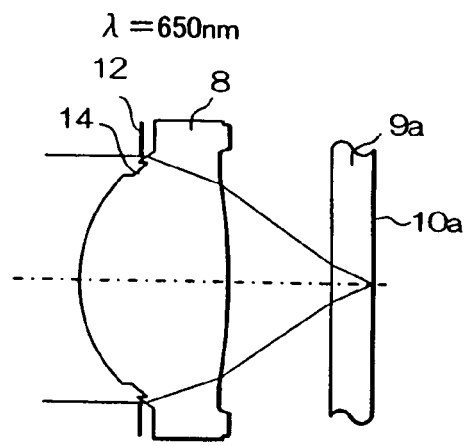
FIGS. 33A and 33B illustrate ray paths for the optical recording media objective lens according to Embodiment 11 of the present invention, with FIG. 33A showing the operation of the objective lens during, DVD recording/reproducing and FIG. 33B showing the operation of the objective lens during CD-R recording/reproducing.
Figure 33B:
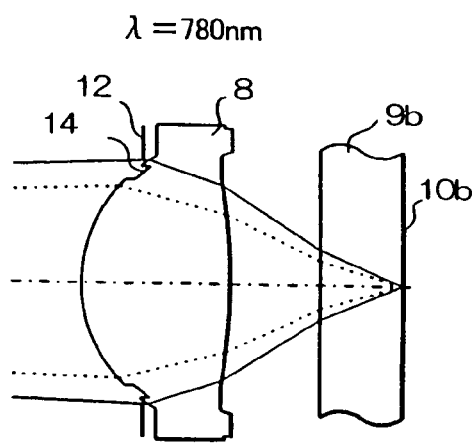

FIG. 33A shows that, when a substantially collimated laser beam having a wavelength of 650 nm ($\lambda_2$) enters the objective lens 8, the incident laser beam is converged by the objective lens 8 onto the recording area 10a of the DVD 9a under no substantial influence of the zonal parts 14. FIG. 33B shows that, when a slightly diverging laser beam having a wavelength of 780 nm ($\lambda_1$) enters the objective lens 8, the incident laser beam is converged by the objective lens 8 onto the recording area 10b of the CD-R 9b with a smaller numerical aperture after the light flux at the periphery is eliminated due to an interference effect of the zonal parts 14.

Figure 34A:
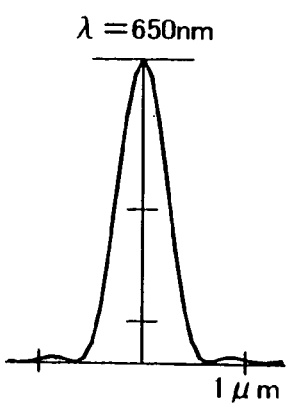
FIGS. 34A and 34B illustrate intensity profiles of the light after being imaged to a spot by the optical recording media objective lens according to Embodiment 11 of the present invention, with FIG. 34A being the light intensity profile of the spot used for DVD recording/reproducing and FIG. 34B being the light intensity profile of the spot used for CD-R recording/reproducing.
Figure 34B:
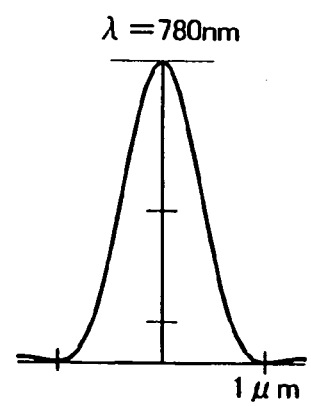

FIGS. 34A and 34B illustrate intensity profiles of the light after being imaged to a spot by the optical recording media objective lens according to Embodiment 11 of the present invention, with FIG. 34A being the light intensity profile of the spot used for DVD recording/reproducing and FIG. 34B being the light intensity profile of the spot used for CD-R recording/reproducing. As is apparent from FIGS. 34A and 34B, the objective lens 8 of this embodiment yields accurately focused beam spots having the required numerical apertures.

Figure 35A:
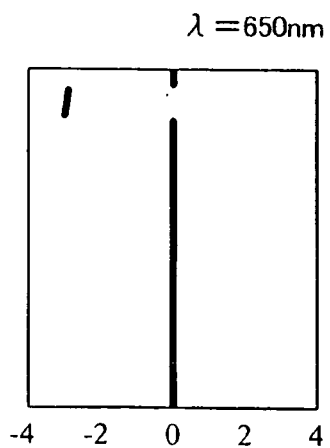
FIGS. 35A and 35B illustrate the wavefront aberrations of the light collected by the optical recording media objective lens of Embodiment 11 of the present invention, with FIG. 35A being the wavefront aberration for DVD recording/reproducing and with FIG. 35B being the wavefront aberration for CD-R recording/reproducing.
Figure 35B:
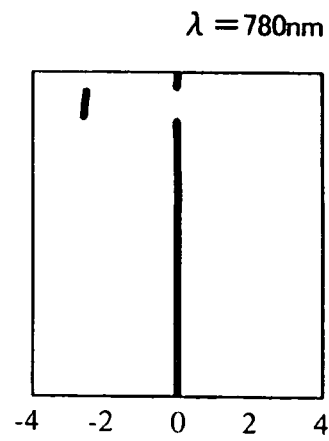

FIGS. 35A and 35B show wavefront aberrations of the light beams collected by the objective lens 8 of this embodiment, with FIG. 35A being for the incident illumination as shown in FIG. 33A and FIG. 35B being for the incident illumination as shown in FIG. 33B. As is apparent from FIGS. 35A and 35B, the objective lens 8 causes a certain phase difference due to the zonal part 14 of the lens surface for both the DVD (FIG. 35A) and the CD-R (FIG. 35B).

In this Embodiment, the zonal part 14 ($1.546 \leq Y < 1.735$) is recessed on the light source side and satisfies the Conditions (3) and (4). The aperture diameter of the smaller numerical aperture, the aperture diameter of the larger numerical aperture, the inner stepped part position, the outer stepped part position, and the values of the Conditions (3) and (4) of this Embodiment are given in Table 33.

EMBODIMENT 12

As mentioned previously, the optical diffraction surface having a phase difference function is omitted from this embodiment, but the zonal part 14 is retained.

37B, the objective lens 8 of this embodiment yields accurately focused beam spots having the required numerical apertures.

Figure 36A:
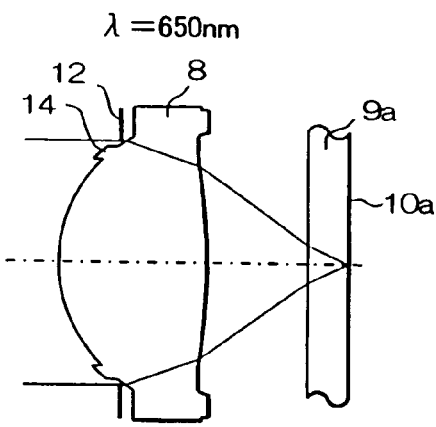
FIGS. 36A and 36B illustrate ray paths for the optical recording media objective lens according to Embodiment 12 of the present invention, with FIG. 36A showing the operation of the objective lens during DVD recording/reproducing and FIG. 36B showing the operation of the objective lens during CD-R recording/reproducing.
Figure 36B:
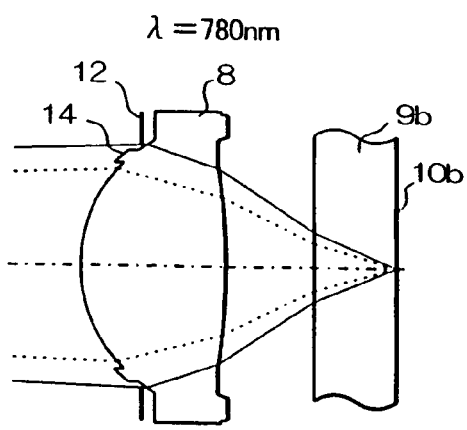
Figure 38A:
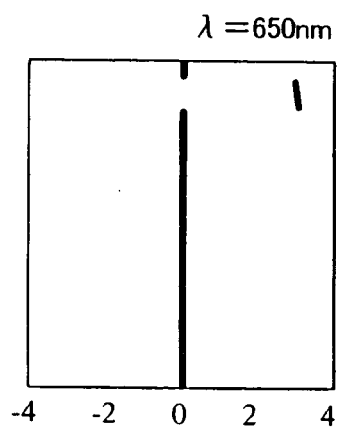
FIGS. 38A and 38B illustrate the wavefront aberrations of the light collected by the optical recording media objective lens of Embodiment 12 of the present invention, with FIG. 38A being the wavefront aberration for DVD recording/reproducing and with FIG. 38B being the wavefront aberration for CD-R recording/reproducing.
Figure 38B:
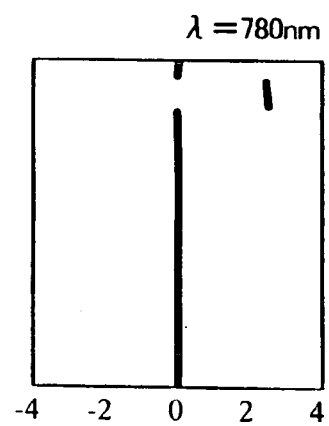
Figure 39A:
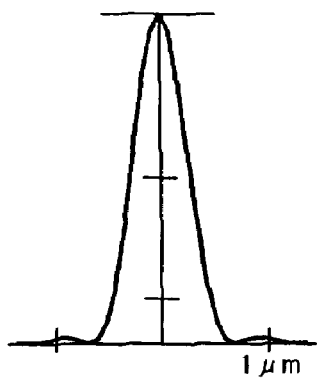
FIGS. 39A-39G illustrate the beam profiles for different numerical apertures and wavelengths of the light collected by a conventional lens.
Figure 39B:
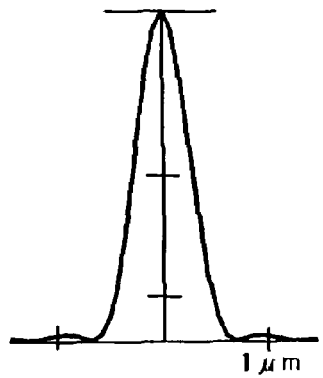
Figure 39C:
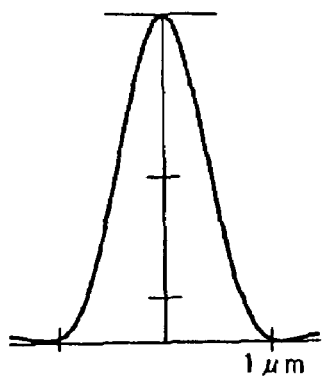
Figure 39D:
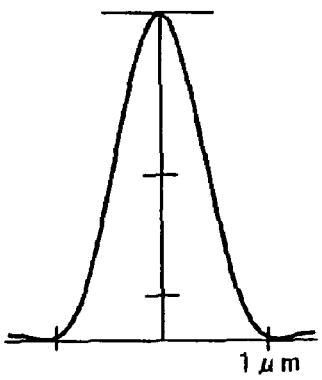
Figure 39E:
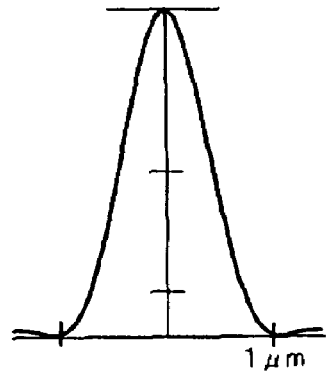
Figure 39F:
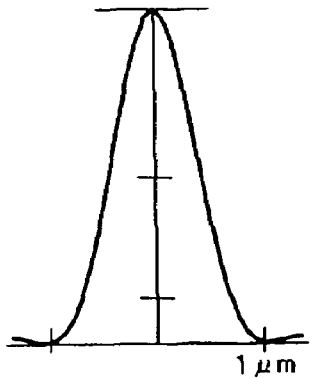
Figure 39G:
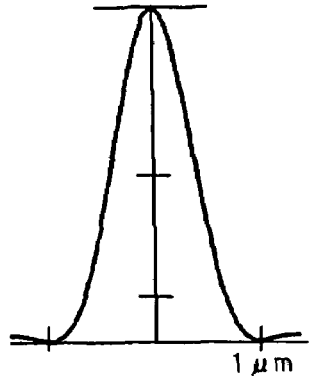

FIGS. 38A and 38B show wavefront aberrations of the light beams collected by the objective lens 8 of this embodiment, with FIG. 38A being for the incident illumination as shown in FIG. 36A and FIG. 38B being for the incident illumination as shown in FIG. 36B. As is apparent from FIGS. 38A and 38B, the objective lens 8 causes a certain phase difference due to the zonal part 14 of the lens surface for both the DVD (FIG. 38A) and the CD-R (FIG. 38B).

In this embodiment, the zonal part 14 ($1.546 \leq Y < 1.735$) protrudes on the light source side and satisfies the Conditions (3) and (4). The aperture diameter of the smaller numerical aperture, the aperture diameter of the larger numerical aperture, the inner stepped part position, the outer

TABLE 31

| # | Surface Type or Radius of Curvature | Surface Spacing $\lambda = 650$ nm | Surface Spacing $\lambda = 780$ nm | Refractive Index $\lambda = 650$ nm | Refractive Index $\lambda = 780$ nm |
|---|---|---|---|---|---|
| (diaphragm) | ∞ | −0.900 | −0.900 | 1.00000 | 1.00000 |
| 1 | aspherical | 2.150 | 2.150 | 1.52270 | 1.51921 |
| 2 | aspherical | 1.486 | 1.314 | 1.00000 | 1.00000 |
| 3 | ∞ | 0.600 | 1.200 | 1.58000 | 1.57000 |
| 4 | ∞ | | | | |

| | $\lambda = 650$ nm | $\lambda = 780$ nm |
|---|---|---|
| Diaphragm diameter, Φ | 3.66 | 3.66 |
| Focal length | 3.05 | 3.07 |
| Numercal Aperture, NA | 0.60 | 0.45 |
| Light source position | ∞ | −50.72 (distance from the surface #1) |

TABLE 32

Coefficients of the Aspherical Equation

| | Surface #1 ($Y < 1.546, Y \geq 1.735$) | Surface #1 ($1.546 \leq Y < 1.735$) | Surface #2 |
|---|---|---|---|
| C | 5.2611873E−1 | 5.2611873E−1 | −1.6534302E−1 |
| K | 0.0 | 0.0 | 0.0 |
| B | 0.0 | −4.3417065E−3 | 0.0 |
| $A_2$ | 8.8231287E−3 | 8.8231287E−3 | 2.4041080E−2 |
| $A_3$ | 5.1373004E−4 | 5.1373004E−4 | −6.6679891E−3 |
| $A_4$ | 9.1493318E−5 | 9.1493318E−5 | 1.0301671E−3 |
| $A_5$ | −2.1808003E−5 | −2.1808003E−5 | −6.5291235E−5 |

FIG. 36A shows that, when a substantially collimated laser beam having a wavelength of 650 nm ($\lambda_2$) enters the objective lens 8, the incident laser beam is converged by the objective lens 8 onto the recording area 10a of the DVD 9a under no substantial influence of the zonal part 14. FIG. 36B shows that, when a slightly diverging laser beam having a wavelength of 780 nm ($\lambda_1$) enters the objective lens 8, the incident laser beam is converged by the objective lens 8 onto the recording area 10b of the CD-R 9b with a smaller numerical aperture after the light flux at the periphery is eliminated due to an interference effect of the zonal part 14.

Figure 37A:
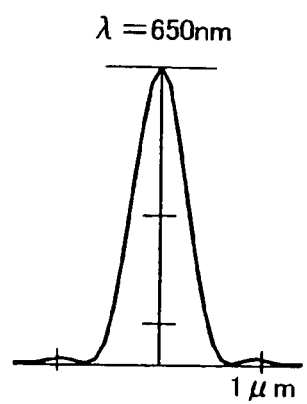
FIGS. 37A and 37B illustrate intensity profiles of the light after being imaged to a spot by the optical recording media objective lens according to Embodiment 12 of the present invention, with FIG. 37A being the light intensity profile of the spot used for DVD recording/reproducing and FIG. 37B being the light intensity profile of the spot used for CD-R recording/reproducing.
Figure 37B:
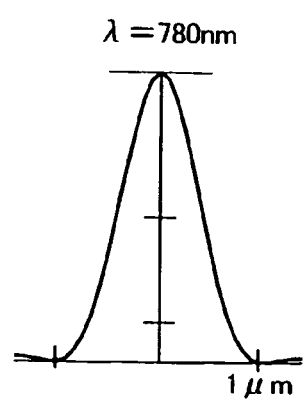

FIGS. 37A and 37B illustrate intensity profiles of the light after being imaged to a spot by the optical recording media objective lens according to Embodiment 12 of the present invention, with FIG. 37A being the light intensity profile of the spot used for DVD recording/reproducing and FIG. 37B being the light intensity profile of the spot used for CD-R recording/reproducing. As is apparent from FIGS. 37A and stepped part position, and the values of the Conditions (3) and (4) for this embodiment are given in Table 33.

Table 33 below lists the values of the aperture diameter (in mm) of the smaller numerical aperture $\Phi_S$, the aperture diameter (in mm) of the larger numerical aperture $\Phi_L$, the inner stepped part position $Y_I$ (in mm) as measured from the optical axis, the outer stepped part position $Y_O$ (in mm) as measured from the optical axis, and the various values a, b, c, (a+c)/b, and a/c listed in Conditions (3) and (4) for Embodiments 1, 2, 7, 8, 11 and 12.

TABLE 33

| | Emb. 1 | Emb. 2 | Emb. 7 | Emb. 8 | Emb. 11 | Emb. 12 |
|---|---|---|---|---|---|---|
| $\Phi_S$ | 3.08 | 3.18 | 3.35 | 3.35 | 2.90 | 2.90 |
| $\Phi_L$ | 4.00 | 4.00 | 4.00 | 4.00 | 3.66 | 3.66 |
| $Y_I$ | 1.653 | 1.676 | 1.752 | 1.752 | 1.546 | 1.546 |
| $Y_O$ | 1.883 | 1.884 | 1.912 | 1.912 | 1.735 | 1.735 |

TABLE 33-continued

|  | Emb. 1 | Emb. 2 | Emb. 7 | Emb. 8 | Emb. 11 | Emb. 12 |
|---|---|---|---|---|---|---|
| a | 0.113 | 0.086 | 0.077 | 0.077 | 0.096 | 0.096 |
| b | 0.230 | 0.208 | 0.160 | 0.160 | 0.189 | 0.189 |
| c | 0.117 | 0.116 | 0.088 | 0.088 | 0.095 | 0.095 |
| (a + c)/b | 1.0 | 0.971 | 1.031 | 1.031 | 1.011 | 1.011 |
| a/c | 0.966 | 0.741 | 0.875 | 0.875 | 1.011 | 1.011 |

Table 34 below lists the values of the aperture diameter (in mm) of the smaller numerical aperture $\Phi_S$, the aperture diameter (in mm) of the larger numerical aperture $\Phi_L$, the inner stepped part position $Y_1$ (in mm) as measured from the optical axis, the outer stepped part position $Y_O$ (in mm) as measured from the optical axis, and the various values of A, B, C, (A+C)/B, and A/C listed in Conditions (5) and (6) for Embodiments 3, 4, 5, 6, 9 and 10.

TABLE 34

|  | Emb. 3 | Emb. 4 | Emb. 5 | Emb. 6 | Emb. 9 | Emb. 10 |
|---|---|---|---|---|---|---|
| $\Phi_S$ | 3.02 | 3.02 | 3.35 | 3.35 | 2.90 | 2.90 |
| $\Phi_L$ | 4.00 | 4.00 | 4.00 | 4.00 | 3.66 | 3.66 |
| $Y_I$ | 1.643 | 1.643 | 1.767 | 1.767 | 1.554 | 1.554 |
| $Y_O$ | 1.892 | 1.892 | 1.922 | 1.922 | 1.743 | 1.743 |
| A | 0.419π | 0.419π | 0.317π | 0.317π | 0.312π | 0.312π |
| B | 0.880π | 0.880π | 0.572π | 0.572π | 0.623π | 0.623π |
| C | 0.420π | 0.420π | 0.306π | 0.306π | 0.311π | 0.311π |
| (A + C)/B | 0.953 | 0.953 | 1.089 | 1.089 | 1.00 | 1.00 |
| A/C | 0.998 | 0.998 | 1.036 | 1.036 | 1.003 | 1.003 |

For comparison with the beam profiles in the embodiments described above, the numerical apertures and beam profiles for various wavelengths of a conventional optical recording media objective lens are shown in FIGS. 39A-39G.

The zonal part can be positioned at any point within the range described above. In order to apparently eliminate the light amount of a light flux having the diameter between the two numerical apertures due to an interference effect, the zonal part can be positioned at a convenient point for optical design within the area effective for the elimination.

With the structure above, more freedom of design is given to the zonal part position, facilitating the designing of a lens having improved optical performance. The optical recording media objective lens of the present invention and the optical pick-up device using it allow for the corresponding numerical apertures to two optical recording media having different specifications in a compact and inexpensive manner with excellent optical performance and with more freedom of design without making the structure of an optical pick-up device more complex.

In the structure described above, a certain optical diffractive surface is formed on at least one of the lens surfaces, desirably on the light source side surface so that all light fluxes are collimated and excellently converged for multiple optical recording media for recording or reproducing.

The invention being thus described, it will be obvious that the same may be varied in many ways. For example, the optical recording media objective lens of the present invention is not restricted to the embodiments described above and various modifications can be made thereto. For example, the optical pick-up device of the present invention is not restricted to those that use a DVD or CD-R as the optical recording media for recording/reproducing. Instead, the present invention is applicable to an optical pick-up device shared by two different optical recording media having different working wavelength ranges and numerical apertures for recording/reproducing. In addition, the present invention may be applicable to two optical recording media that have different specifications, but the same disk thickness. The optical diffractive surface and zonal part of the objective lens 8 are configured based on the required specifications for each optical recording media.

The objective lens 8 can be made of plastic materials, which reduce the weight and cost of the lens. The objective lens of the embodiments described above is a spherical on both surfaces in order to improve correction of aberrations. However, instead of using a spherical surfaces, a spherical lens can be used. Alternatively, only one of the surfaces may be a spherical.

Also, the zonal part 14 of the objective lens 8 can protrude towards the light source. Although the optical pick-up device of the embodiments described above has two light sources that emit different wavelengths, and a selected light source is used depending on the optical recording medium used, one light source that selectively emits light of two different wavelengths, depending on the optical recording medium used, can be provided.

In the embodiments described above, the objective lens 8 has the optical diffractive surface on the first surface 16. Therefore, the light from the light source is nearly collimated before it enters the objective lens 8 for both optical recording media. As described above, it is unnecessary to provide the optical diffractive surface on the objective lens 8 where the objective lens 8 is allowed to receive nearly collimated light for one of the optical recording media (for example, the DVD) and slightly diverged light from the light source for the other optical recording medium (for example the CD-R). Nevertheless, the optical diffractive surface can be formed in such a case. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An optical recording media objective lens for converging working lights of a first wavelength and a second wavelength at predetermined points onto a first optical recording medium and a second optical recording medium, respectively, the working light of the first wavelength being converged at a first numerical aperture onto the first optical recording medium and the working light of the second wavelength being converged at a second numerical aperture onto the second optical recording medium for recording or reproducing information, said optical recording media objective lens comprising:

an aperture adjusting zonal part on at least one of its lens surfaces for apparently eliminating light at the periphery of a light flux having a wavelength $\lambda_1$ while maintaining light at the periphery of a light flux having a wavelength $\lambda_2$ where $\lambda_1$, is one of the first and second wavelengths and $\lambda_2$ is the other wavelength; and the aperture adjusting zonal part is formed between two concentric stepped parts about the optical axis of the objective lens in a manner such that the following Conditions (1) and (2) are satisfied $\Delta_1 = (2n+1) \cdot \lambda_1/2 + \delta_1$      Condition (1)

$\Delta_2 = m \cdot \lambda_2 + \delta_2$      Condition (2)

where
- $\Delta_1$ is the difference in optical path length from the light source to the focus point of the optical recording media objective lens for light having the wavelength $\lambda_1$ that would pass through the area where the zonal part would be if the zonal part were to be removed from the optical recording media objective lens versus the light passing through the zonal part;
- $\Delta_2$ is the difference in optical path length from the light source to the focus point of the optical recording media objective lens for light having the wavelength $\lambda_2$ that would pass through the area where the zonal part would be if the zonal part were to be removed from the optical recording media objective lens versus the light passing through the zonal part;
- m and n are integers;
- $\delta_1$ is a constant within the range $|\delta_1| \leq 0.25\,\lambda_1$; and
- $\delta_2$ is a constant within the range $|\delta_2| \leq 0.25\,\lambda_2$;

wherein the following Condition (3) is also satisfied:

$$0.95 \leq (a+c)/b \leq 1.05 \qquad \text{Condition (3)}$$

where
- a is the distance in a direction orthogonal to the optical axis between the boundary of the smaller one of the first and second numerical apertures and the inner one of the two stepped parts,
- b is the distance in a direction orthogonal to the optical axis between the inner stepped part and the outer stepped part, and
- c is the distance in a direction orthogonal to the optical axis between the outer stepped part and the boundary of the larger one of the first and second numerical apertures.

2. An optical recording media objective lens for converging working lights of a first wavelength and a second wavelength at predetermined points onto a first optical recording medium and a second optical recording medium, respectively, the working light of the first wavelength being conversed at a first numerical aperture onto the first optical recording medium and the working light of the second wavelength being converged at a second numerical aperture onto the second optical recording medium for recording or reproducing information, said optical recording media objective lens comprising;
- an aperture adjusting zonal part on at least one of its lens surfaces for apparently eliminating light at the periphery of a light flux having a wavelength $\lambda_1$ while maintaining light at the periphery of a light flux having a wavelength $\lambda_2$, where $\lambda_1$ is one of the first and second wavelengths and $\lambda_2$ is the other wavelength; and
- the aperture adjusting zonal cart is formed between two concentric stepped parts about the optical axis of the objective lens in a manner such that the following Conditions (1) and (2) are satisfied $$\Delta_1 = (2n+1)\cdot\lambda_1/2 + \delta_1 \qquad \text{Condition (1)}$$

$$\Delta_2 = m\cdot\lambda_2 + \delta_2 \qquad \text{Condition (2)}$$

where
- $\Delta_1$ is the difference in optical path length from the light source to the focus point of the optical recording media objective lens for light having the wavelength $\lambda_1$ that would pass through the area where the zonal part would be if the zonal part were to be removed from the optical recording media objective lens versus the light passing through the zonal part;
- $\Delta_2$ is the difference in optical path length from the light source to the focus point of the optical recording media objective lens for light having the wavelength $\lambda_2$ that would pass through the area where the zonal part would be if the zonal part were to be removed from the optical recording media objective lens versus the light passing through the zonal part;
- m and n are integers:
- $\delta_1$ is a constant within the range $|\delta_1| \leq 0.25\,\lambda_1$; and
- $\delta_2$ is a constant within the range $|\delta_2| \leq 0.25\,\lambda_2$;

and further comprising an optical diffractive surface on at least one surface of the optical recording media objective lens;

wherein the following Condition (3) is also satisfied:

$$0.95 \leq (a+c)/b \leq 1.05 \qquad \text{Condition (3)}$$

where
- a is the distance in a direction orthogonal to the optical axis between the boundary of the smaller one of the first and second numerical apertures and the inner one of the two stepped parts,
- b is the distance in a direction orthogonal to the optical axis between the inner stepped part and the outer stepped part, and
- c is the distance in a direction orthogonal to the optical axis between the outer stepped part and the boundary of the larger one of the first and second numerical apertures.

3. The optical recording media objective lens according to claim 1, wherein the following Condition (4) is also satisfied:

$$0.95 \leq a/c\ 1.05 \qquad \text{Condition (4).}$$

4. The optical recording media objective lens according to claim 2, wherein the following Condition (4) is also satisfied:

$$0.95 \leq a/c\ 1.05 \qquad \text{Condition (4).}$$

5. An optical recording media objective lens for converging working lights of a first wavelength and a second wavelength at predetermined points onto a first optical recording medium and a second optical recording medium, respectively, the working light of the first wavelength being converged at a first numerical aperture onto the first optical recording medium and the working light of the second wavelength being converged at a second numerical aperture onto the second optical recording medium for recording or reproducing information, said optical recording media objective lens comprising:
- an aperture adjusting zonal part on at least one of its lens surfaces for apparently eliminating light at the periphery of a light flux having a wavelength $\lambda_1$ while maintaining light at the periphery of a light flux having a wavelength $\lambda_2$ where $\lambda_1$ is one of the first and second wavelengths and $\lambda_2$ is the other wavelength; and
- the aperture adjusting zonal part is formed between two concentric stepped parts about the optical axis of the objective lens in a manner such that the following Conditions (1) and (2) are satisfied $$\Delta_1 = (2n+1)\cdot\lambda_1 2 + \delta_1 \qquad \text{Condition (1)}$$

$$\Delta_2 = m\ \cdot\lambda_2 + \delta_2 \qquad \text{Condition (2)}$$

where
- $\Delta_1$ is the difference in optical path length from the light source to the focus point of the optical recording media objective lens for light having the wavelength $\lambda_1$ that would pass through the area where the zonal part would be if the zonal part were to be removed from the optical recording media objective lens versus the light passing through the zonal part;

$\Delta_2$ is the difference in optical path length from the light source to the focus point of the optical recording media objective lens for light having the wavelength $\lambda_2$ that would pass through the area where the zonal part would be if the zonal part were to be removed from the optical recording media objective lens versus the light passing through the zonal part;

m and n are integers;

$\delta_1$ is a constant within the range $|\delta_1| \leq 0.25\ \lambda_1$ and $\delta_2$ is a constant within the range $|\delta_2| \leq 0.25\ \lambda_2$;

wherein the following Condition (5) is also satisfied:

$$0.90 \leq (A+C)/B \leq 1.10 \qquad \text{Condition (5)}$$

where

A is the area projected onto a plane that is orthogonal to the optical axis of the region between the boundary of the smaller one of the first and second numerical apertures and the inner one of the two stepped parts, B is the area projected onto a plane that is orthogonal to the optical axis of the region between the inner stepped part and the outer one of the two stepped parts, and C is the area projected onto a plane that is orthogonal to the optical axis of the region between the outer stepped part and the boundary of the larger one of the first and second numerical apertures.

6. An optical recording media objective lens for converging working lights of a first wavelength and a second wavelength at predetermined points onto a first optical recording medium and a second optical recording medium, respectively, the working light of the first wavelength being converged at a first numerical aperture onto the first optical recording medium and the working light of the second wavelength being converged at a second numerical aperture onto the second optical recording medium for recording or reproducing information, said optical recording media objective lens comprising:

an aperture adjusting zonal part on at least one of its lens surfaces for apparently eliminating light at the periphery of a light flux having a wavelength $\lambda_1$ while maintaining light at the periphery of a light flux having a wavelength $\lambda_2$, where $\lambda_1$ is one of the first and second wavelengths and $\lambda_2$ is the other wavelength; and the aperture adjusting zonal part is formed between two concentric stepped parts about the optical axis of the objective lens in a manner such that the following Conditions (1) and (2) are satisfied $$\Delta_1 = (2n+1) \cdot \lambda_1/2 + \delta_1 \qquad \text{Condition (1)}$$

$$\Delta_2 = m \cdot \lambda_2 + \delta_2 \qquad \text{Condition (2)}$$

where $\Delta_1$ is the difference in optical path length from the light source to the focus point of the optical recording media objective lens for light having the wavelength $\lambda_1$ that would pass through the area where the zonal part would be if the zonal part were to be removed from the optical recording media objective lens versus the light passing through the zonal part;

$\Delta_2$ is the difference in optical path length from the light source to the focus point of the optical recording media objective lens for light having the wavelength $\lambda_2$ that would pass through the area where the zonal part would be if the zonal part were to be removed from the optical recording media objective lens versus the light passing through the zonal part;

m and n are integers:

$\delta_1$ is a constant within the range $|\delta_1| \leq 0.25\ \lambda_1$; and $\delta_2$ is a constant within the range $|\delta_2| \leq 0.25\ \lambda_2$;

and further comprising an optical diffractive surface on at least one surface of the optical recording media objective lens, wherein the following Condition (5) is also satisfied:

$$0.90 \leq (A+C)/B \leq 1.10 \qquad \text{Condition (5)}$$

where

A is the area projected onto a plane that is orthogonal to the optical axis of the region between the boundary of the smaller one of the first and second numerical apertures and the inner one of the two stepped parts, B is the area projected onto a plane that is orthogonal to the optical axis of the region between the inner stepped part and the outer one of the two stepped parts, and C is the area projected onto a plane that is orthogonal to the optical axis of the region between the outer stepped part and the boundary of the larger one of the first and second numerical apertures.

7. The optical recording media objective lens according to claim 5, wherein the following Condition (6) is also satisfied:

$$0.90 \leq A/C \leq 1.10 \qquad \text{Condition(6).}$$

8. The optical recording media objective lens according to claim 6, wherein the following Condition (6) is also satisfied:

$$0.90 \leq A/C \leq 1.10 \qquad \text{Condition (6).}$$

9. An optical pick-up device that includes the optical recording media objective lens according to claim 1.

10. An optical pick-up device that includes the optical recording media objective lens according to claim 2.

11. An optical pick-up device that includes the optical recording media objective lens according to claim 3.

12. An optical pick-up device that includes the optical recording media objective lens according to claim 4.

13. An optical pick-up device that includes the optical recording media objective lens according to claim 5.

14. An optical pick-up device that includes the optical recording media objective lens according to claim 6.

15. An optical pick-up device that includes the optical recording media objective lens according to claim 7.

16. An optical pick-up device that includes the optical recording media objective lens according to claim 8.

* * * * *

UNITED STATES PATENT AND TRADEMARK OFFICE
CERTIFICATE OF CORRECTION

PATENT NO. : 7,298,687 B2
APPLICATION NO. : 10/874388
DATED : November 20, 2007
INVENTOR(S) : Kitahara et al.

It is certified that error appears in the above-identified patent and that said Letters Patent is hereby corrected as shown below:

Col. 1
Line 28, change "all" to -- an --;
Line 42, change "outer" to -- other --;

Col. 6
Line 13, change "all" to -- an --;

Col. 7
Line 27, change "tile" to -- the --;
Line 41, in Condition (5), change "<" to -- $\leq$ --;

Col. 8
Line 14, change "recording" to -- recording medium. --;

Col. 9
Line 4, change "showing" to -- shown --;
Line 5, change "en-or" to -- error --;
Lines 38, 39, 41 - 42, and 45, change "a spheric" to -- aspheric --;

Col. 10
Line 8, change "wavelength Thus," to -- wavelength. Thus, --;

Col. 11
Line 2, change "parts" to -- part --;
Lines 26 - 27, change "a spherical" to -- aspherical --;
Lines 41 and 43, change "mill." to -- mm. --;

Col. 13
Line 10, change "a spherical" to -- aspherical --;
Line 11, change "Surfaces" to -- surfaces --;

Col. 14
Lines 5 - 6 and line 8, change "a spheric" to -- aspheric --;
Line 32, change "A spherical" to -- Aspherical --;

Col. 15
Lines 55 and 61, change "parts" to -- part --;

UNITED STATES PATENT AND TRADEMARK OFFICE
CERTIFICATE OF CORRECTION

PATENT NO. : 7,298,687 B2
APPLICATION NO. : 10/874388
DATED : November 20, 2007
INVENTOR(S) : Kitahara et al.

It is certified that error appears in the above-identified patent and that said Letters Patent is hereby corrected as shown below:

Col. 16
Line 4, change "having," to -- having --;

Col. 17
Lines 5 and 11, change "parts" to -- part --;
Line 18, change "tile" to -- the --;

Col. 21
Line 42, change "parts" to -- part --;

Col. 22
Line 15, change "parts" to -- part --;
Line 23, change "tile" to -- the --;

Col. 23
Line 38, change "parts" to -- part --;

Col. 24
Line 21, change "Focused" to -- focused --;

Col. 25
Line 35, change "parts" to -- part --;

Col. 26
Line 27, change "Surface" to -- surface --;

Col. 27
Lines 28 and 34, change "parts" to -- part --;

Col. 29
Line 19 and 25, change "parts" to -- part --;

Col. 31
Line 5, change "parts" to -- part --;

UNITED STATES PATENT AND TRADEMARK OFFICE
CERTIFICATE OF CORRECTION

PATENT NO.       : 7,298,687 B2
APPLICATION NO.  : 10/874388
DATED            : November 20, 2007
INVENTOR(S)      : Kitahara et al.

It is certified that error appears in the above-identified patent and that said Letters Patent is hereby corrected as shown below:

Col. 32
Lines 47 and 53, change "parts" to -- part --; and

Col. 36
Lines 10, 12 and 14, change "a spherical" to -- aspherical --.

Signed and Sealed this

Eighth Day of April, 2008

JON W. DUDAS
*Director of the United States Patent and Trademark Office*